(12) United States Patent
Bell et al.

(10) Patent No.: US 12,470,898 B2
(45) Date of Patent: Nov. 11, 2025

(54) COLLABORATIVE MONITORING OF LOCATION CONDITIONS

(71) Applicant: International Business Machines Corporation, Armonk, NY (US)

(72) Inventors: Denise Bell, Austin, TX (US); Gianluca Gargaro, Rome (IT); Maria Carmela Alesina, Rome (IT); Stefania Errore, Rome (IT)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 17/690,047

(22) Filed: Mar. 9, 2022

(65) Prior Publication Data

US 2023/0319524 A1  Oct. 5, 2023

(51) Int. Cl.
| | |
|---|---|
| *H04W 4/38* | (2018.01) |
| *H04W 4/021* | (2018.01) |
| *H04W 4/029* | (2018.01) |
| *H04W 4/70* | (2018.01) |

(52) U.S. Cl.
CPC .......... *H04W 4/38* (2018.02); *H04W 4/021* (2013.01); *H04W 4/029* (2018.02); *H04W 4/70* (2018.02)

(58) Field of Classification Search
CPC ....... H04W 4/38; H04W 4/021; H04W 4/029; H04W 4/70
See application file for complete search history.

(56) References Cited

U.S. PATENT DOCUMENTS

| | | | |
|---|---|---|---|
| 6,434,271 B1 * | 8/2002 | Christian | G06V 40/103 |
| | | | 348/415.1 |
| 8,451,140 B2 | 5/2013 | Piccinini | |
| 8,781,715 B2 | 7/2014 | Breed | |
| 9,108,640 B2 | 8/2015 | Jackson | |
| 9,218,698 B2 | 12/2015 | Ricci | |
| 9,360,556 B2 | 6/2016 | Zhu | |

(Continued)

FOREIGN PATENT DOCUMENTS

| | | |
|---|---|---|
| CN | 102589895 B | 4/2015 |
| CN | 103057376 B | 6/2016 |

(Continued)

*Primary Examiner* — James J Yang
(74) *Attorney, Agent, or Firm* — Daniel M. Yeates

(57) ABSTRACT

A computer-implemented method for monitoring a condition of a location is disclosed. This method includes storing monitoring records relating to segments of the location comprising one or more monitoring records being collected by the mobile computing device passing through the segment and monitoring records being received from a source mobile computing device of the mobile computing devices, each of the monitoring records comprising monitoring values indicative of a condition of corresponding positions of the corresponding segment, transmitting the monitoring records of each segment being stored to a target mobile computing devices, filtering the monitoring records of each segment being stored according to a homogeneity thereof, and uploading the monitoring records of each segment being filtered to validate the monitoring records of each segment according to a matching thereof and to determine at least one condition indicator of each segment according to the corresponding monitoring records being validated.

19 Claims, 12 Drawing Sheets

(56) References Cited

U.S. PATENT DOCUMENTS

| | | | |
|---|---|---|---|
| 9,593,521 B2 | 3/2017 | Breed | |
| 10,247,854 B2 | 4/2019 | Zhu | |
| 10,275,955 B2 | 4/2019 | Gupta | |
| 10,332,322 B2 | 6/2019 | Nix | |
| 10,509,127 B2 | 12/2019 | Englard | |
| 10,724,865 B1 | 7/2020 | Ferguson | |
| 2017/0278194 A1 | 9/2017 | Macneille | |
| 2019/0311554 A1* | 10/2019 | Ewert | G07C 5/008 |
| 2019/0349347 A1* | 11/2019 | Curtis | H04L 63/0876 |
| 2019/0370760 A1 | 12/2019 | Kundu | |
| 2021/0027624 A1 | 1/2021 | Oberdanner | |
| 2021/0097311 A1* | 4/2021 | McBeth | G08G 1/096775 |

FOREIGN PATENT DOCUMENTS

| | | |
|---|---|---|
| CN | 104691447 B | 2/2018 |
| CN | 113091760 A | 7/2021 |
| CN | 109584595 B | 10/2021 |
| WO | 2003053747 A1 | 7/2003 |
| WO | 2014062109 A1 | 4/2014 |
| WO | 2016012190 A1 | 1/2016 |

* cited by examiner

COLLABORATIVE MONITORING OF LOCATION CONDITIONS

BACKGROUND

The present disclosure relates to the information technology field. More specifically, this disclosure relates to monitoring and analyzing location specific data.

The monitoring of several types of locations, either human artefacts or natural structures, is commonplace for a number of purposes. Particularly, many locations are monitored to determine their conditions, such as deterioration or wear, safety, usage, functionality and so on. A typical example is the monitoring of roads, such as for the presence of damages (such as potholes). The information obtained allows for the identification of dangerous areas of the roads (where relatively deep potholes are present). In this way, it is possible to alert drivers of vehicles that are approaching the dangerous areas (to make them reduce a driving speed), to inform competent authorities (to make them intervene by installing danger signs or performing maintenance activities) and so on.

SUMMARY

According to one embodiment of the present invention, a computer-implemented method for monitoring a condition of a location is disclosed. The computer-implemented method includes storing a corresponding plurality of monitoring records relating to each of one or more segments of the location comprising at least one monitoring record being collected by the mobile computing device passing through the segment and one or more monitoring records being received from one or more source mobile computing devices of the mobile computing devices, each of the monitoring records comprising one or more monitoring values indicative of a condition of corresponding positions of the corresponding segment. The computer-implemented method further includes transmitting the monitoring records of each segment being stored to one or more target mobile computing devices of the mobile computing devices. The computer-implemented method further includes filtering the monitoring records of each segment being stored according to a homogeneity thereof. The computer-implemented method further includes uploading the monitoring records of each segment being filtered to a central computing system to cause the central computing system to validate the monitoring records of each segment being uploaded by the mobile computing devices according to a matching thereof and to determine at least one condition indicator of each segment according to the corresponding monitoring records being validated.

According to another embodiment of the present invention, a computer program product for monitoring a condition of a location is disclosed. The computer program product includes one or more computer readable storage media and program instructions stored on the one or more computer readable storage media. The program instructions include instructions to store a corresponding plurality of monitoring records relating to each of one or more segments of the location comprising at least one monitoring record being collected by the mobile computing device passing through the segment and one or more monitoring records being received from one or more source mobile computing devices of the mobile computing devices, each of the monitoring records comprising one or more monitoring values indicative of a condition of corresponding positions of the corresponding segment. The program instructions further include instructions transmit the monitoring records of each segment being stored to one or more target mobile computing devices of the mobile computing devices. The program instructions further include instructions filter the monitoring records of each segment being stored according to a homogeneity thereof. The program instructions further include instructions upload the monitoring records of each segment being filtered to a central computing system to cause the central computing system to validate the monitoring records of each segment being uploaded by the mobile computing devices according to a matching thereof and to determine at least one condition indicator of each segment according to the corresponding monitoring records being validated.

According to another embodiment of the present invention, a computer system for monitoring a condition of a location is disclosed. The computer system includes one or more computer processors, one or more computer readable storage media, and computer program instructions, the computer program instructions being stored on the one or more computer readable storage media for execution by the one or more computer processors. The program instructions include instructions to store a corresponding plurality of monitoring records relating to each of one or more segments of the location comprising at least one monitoring record being collected by the mobile computing device passing through the segment and one or more monitoring records being received from one or more source mobile computing devices of the mobile computing devices, each of the monitoring records comprising one or more monitoring values indicative of a condition of corresponding positions of the corresponding segment. The program instructions further include instructions transmit the monitoring records of each segment being stored to one or more target mobile computing devices of the mobile computing devices. The program instructions further include instructions filter the monitoring records of each segment being stored according to a homogeneity thereof. The program instructions further include instructions upload the monitoring records of each segment being filtered to a central computing system to cause the central computing system to validate the monitoring records of each segment being uploaded by the mobile computing devices according to a matching thereof and to determine at least one condition indicator of each segment according to the corresponding monitoring records being validated.

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

DETAILED DESCRIPTION

Figure 1A:
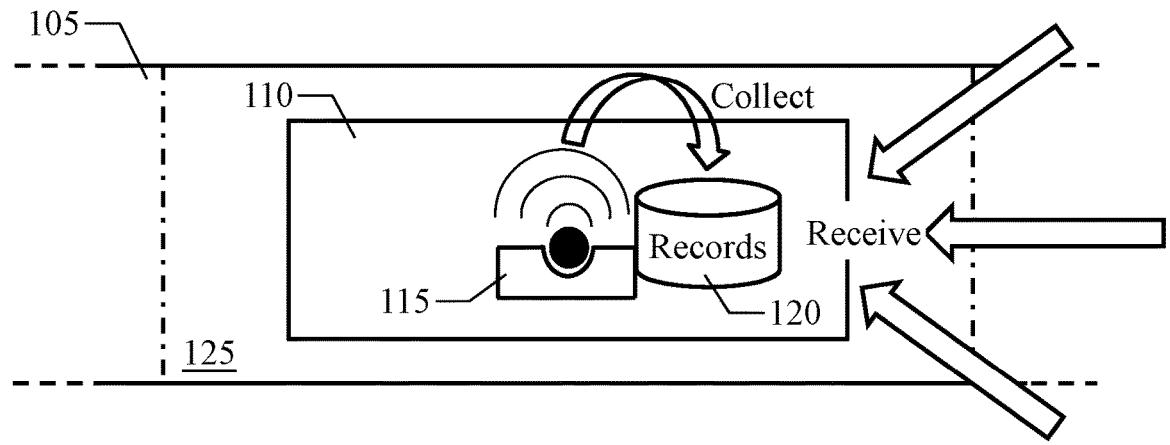
FIG. 1A-FIG. 1F show the general principles of the solution according to an embodiment of the present disclosure.

The present disclosure relates to the information technology field. More specifically, this disclosure relates to monitoring and analyzing location specific data.

Drivers do not have reliable and up to date information about the condition of the roads they plan to take on daily commutes as well as long distance trips. In addition, the teams responsible for maintaining the condition of roads do not have methods to determine what sections need repair and how significant that work will be without manual inspections. The evolution of modern car sensors as well as the collection and the analysis of the acquired data with Artificial Intelligence (AI) has introduced new ways to evaluate risk associated in taking a road at a specific time. However, this evaluation is a proprietary analysis and "scoring" of the road condition and its risk, so while this data can be used to offer new services from the owner of the data, they cannot be considered as data of the de-facto status of a road.

The monitoring of locations may be inspected directly by (human) specialized personnel. However, the inspection of the locations is not always possible (such as because of size and/or position of the locations). Moreover, the corresponding operations are time-consuming and expensive, so that they are generally performed with a relatively low frequency. In any case, this does not allow monitoring the locations in real-time. As a consequence, any changes of the locations may be detected only at a next inspection thereof and then with a corresponding delay (relatively long in case of low frequency of the inspections), thereby preventing prompt detection of dangerous situations in the locations.

Alternatively, sensors are used to collect values of parameters indicative of conditions of the locations continuously (at corresponding positions thereof). The parameter values so collected are then analyzed to estimate the conditions of the locations at the corresponding positions (such has by applying artificial intelligence techniques).

For this purpose, monitoring infrastructures may be deployed by installing a series of fixed sensors throughout the locations. However, the monitoring infrastructures may be very expensive (or even unfeasible in practice), especially in the case of large locations (such as a wide road network). In any case, a resolution of the positions of the locations that may be monitored depends on a distribution of the fixed sensors throughout the locations, which distribution is limited by the number of fixed sensors that may be installed (for either practical or economic reasons).

Mobile sensors are instead used to monitor the locations while passing through them. Particularly, the mobile sensors collect the parameter values at different positions of the locations in association with an indication of where the parameter values have been measured. For example, specific models of vehicles of some manufacturers are equipped with sensors for measuring parameter values indicative of the conditions of the roads on which the vehicles travel (such as accelerometers for measuring vibrations) and for tracking the positions of the vehicles (such as GPS receivers for providing geographical coordinates). The vehicles are also equipped with mobile telephone transceivers for uploading the information so collected to servers of the corresponding manufacturers. The server of each manufacturer analyzes the information received from its vehicles to determine the corresponding conditions of the roads. Whenever a dangerous situation is detected in a specific dangerous area of the roads, the server broadcasts a corresponding alarm to any vehicles of the same manufacturer that are approaching the dangerous area. At the same time, the server of the manufacturer may also notify the dangerous situation to an authority in charge of maintaining the roads. However, this is not of general applicability (since each manufacturer applies a proprietary analysis that is limited to the information collected by its vehicles only).

In the same context, the use of a blockchain has also been proposed. Particularly, terminals mounted on vehicles may serve as nodes forming a blockchain network wherein a smart contract is deployed. The smart contract is used by the terminal of each vehicle to request the terminals of the other vehicles to provide information about the condition of a road segment toward which the vehicle is going to travel. The blockchain technology may also be used to achieve a consensus on a same accident or congestion of a road detected by multiple vehicles for transmitting a corresponding warning message.

In any case, the above-mentioned techniques are quite ineffective in providing reliable information about the conditions of the locations in case heterogeneous sensors are used to collect the monitoring values thereof.

Embodiments of the present invention recognize existing solutions do not provide the capability to "certify" the status of a road surface conditions at a specific time so that a non-repudiation of this information can be achieved. This certified information is crucial when dealing with forensic analysis as well as when a contract among the road owner and the road maintainer is to be evaluated and the service level agreement (SLA) verified.

Embodiments of the present invention recognize it is very difficult to obtain information about the conditions of the locations that may be trusted in general terms. Embodiments of the present invention provide information to a driver to help them avoid poor road conditions. Embodiments of the present invention relate to a method for creating a digital map as the basis for a driver assistance system which is configured to assist a driver in negotiating road damage. Embodiments of the present invention comprise detecting road damage on a road having a vehicle, detecting the position of the vehicle when the road damage is detected, and entering map information on the digital map, on which the detected road damage is associated with the detected position.

With reference in particular to FIG. 1A-FIG. 1F, the general principles in accordance with one or more solutions to the aforementioned problems in accordance with at least one embodiment of the present disclosure.

As depicted in FIG. 1A, a condition of a generic location has to be monitored. The location may be either artificial or natural, i.e., any artefact made by mankind or any structure available in nature, respectively. Particularly, in the example at issue, the location is a road 105, which is defined by a line of communication with stabilized surface. The road 105 is open to public for use by (primarily motor) vehicles 110. The road 105 is monitored by means of a plurality of mobile computing devices, or simply terminals 115 passing through it (only one shown in the figure). In the example, the terminals 115 are carried by the vehicles 110 travelling along the road 105 (such as being mounted thereon). Each terminal 115 stores monitoring records 120 relating to corresponding segments 125 of the road 105, such as pre-defined portions thereof (only one shown in the figure). Each monitoring record 120 comprises one or more monitoring values that are indicative of a condition of corresponding positions of its segment 125 (for example, vibration values). Particularly, the (stored) monitoring records 120 of the segment 125 comprise a (collected) monitoring record 120 that is collected by the terminal 115 while it passes through the segment 125. For example, the terminal 115 is provided with one or more sensors, which may be either devices that produce a signal representative of a physical phenomenon (for example, an accelerometer for measuring a vibration) or devices that receive a manual input (for example, a touch-screen for entering a notice of an accident). In addition or in alternative, the (stored) monitoring records 120 of the segment 125 comprise one or more (received) monitoring records 120 that are received from other (source) terminals, not shown in the figure, which have likewise collected them when these terminals have passed through the segment 125 (such as mounted on other vehicles, not shown in the figure, preceding the vehicle 110 along a travel direction along the road 105).

Figure 1B:
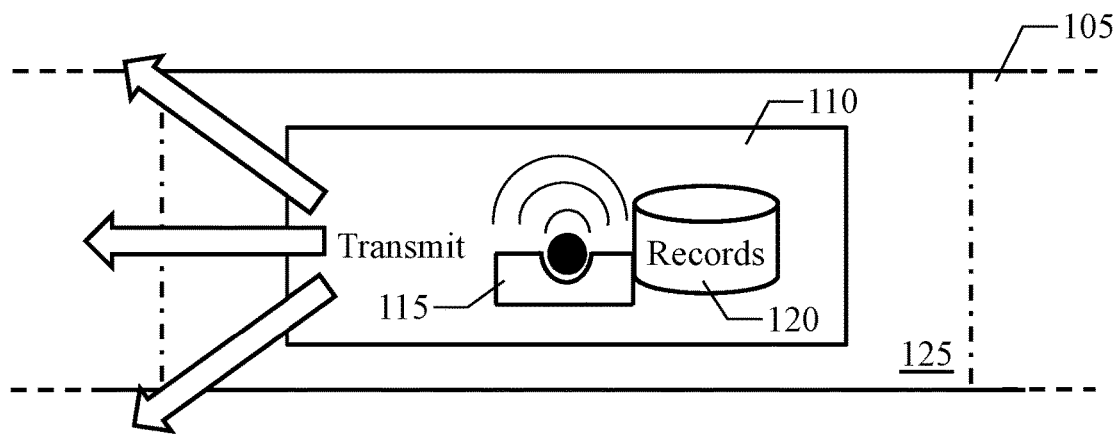

As depicted in FIG. 1B, the terminal 115 transmits the (stored) monitoring records 120 of the segment 125 (i.e., the collected monitoring record 120 and/or the received monitoring records 120) to one or more other (target) terminals, not shown in the figure, that are close (i.e., within a predetermined distance) to the terminal 115 (such as mounted on other vehicles, not shown in the figure, following the vehicle 110 along the travel direction in the road 105).

Figure 1C:
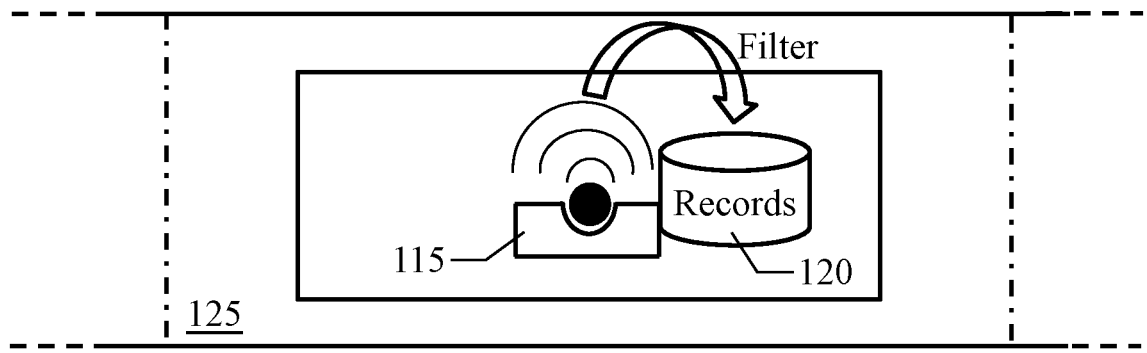

As depicted in FIG. 1C, the terminal 115 filters the (stored) monitoring records 120 of the segment 125. The monitoring records 120 of the segment 125 are filtered according to their homogeneity. For example, by discarding each received monitoring record 120 that significantly differs from the collected monitoring record 120.

Figure 1D:
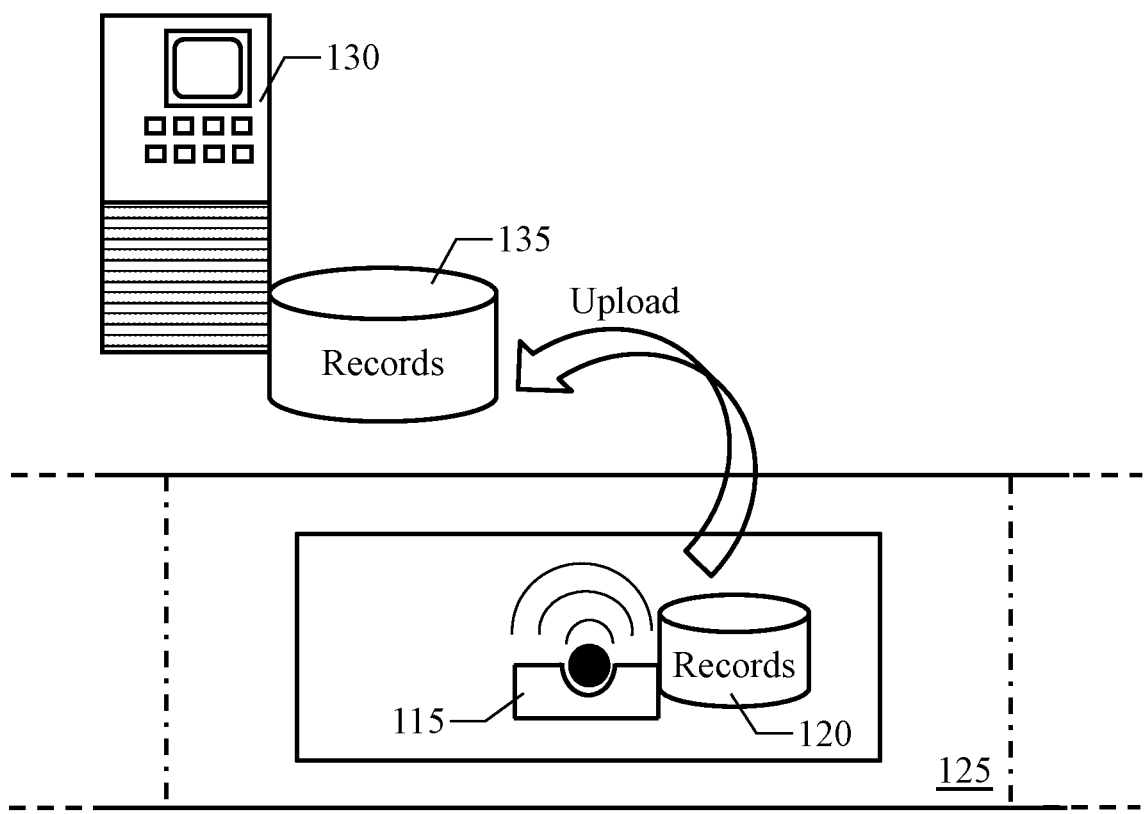

As depicted in FIG. 1D, the terminal 115 uploads the (filtered) monitoring records 120 of the segment 115 to one or more central computing systems, or simply servers 130 (such as once the monitoring records of the segment 125 reach a sufficient number). The same operation is performed by the other terminals as well (not shown in the figure). Therefore, the server 130 stores the monitoring records of the segment 125, denoted with the reference 135, that have been uploaded thereto by the different terminals.

Figure 1E:
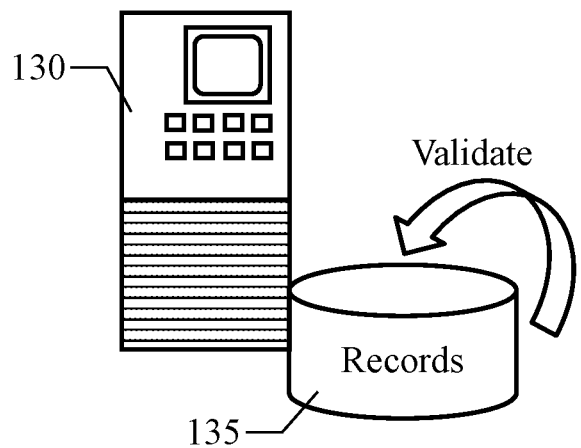

As depicted in FIG. 1E, the servers 130 validate the (uploaded) monitoring records 135 of the segment 125 (shown in FIG. 1D). The monitoring records 135 of the segment 125 are validated according to their matching (for example, by verifying that the monitoring records 135 of the segment 125 are provided by a sufficient number of terminals in a consistent way).

Figure 1F:
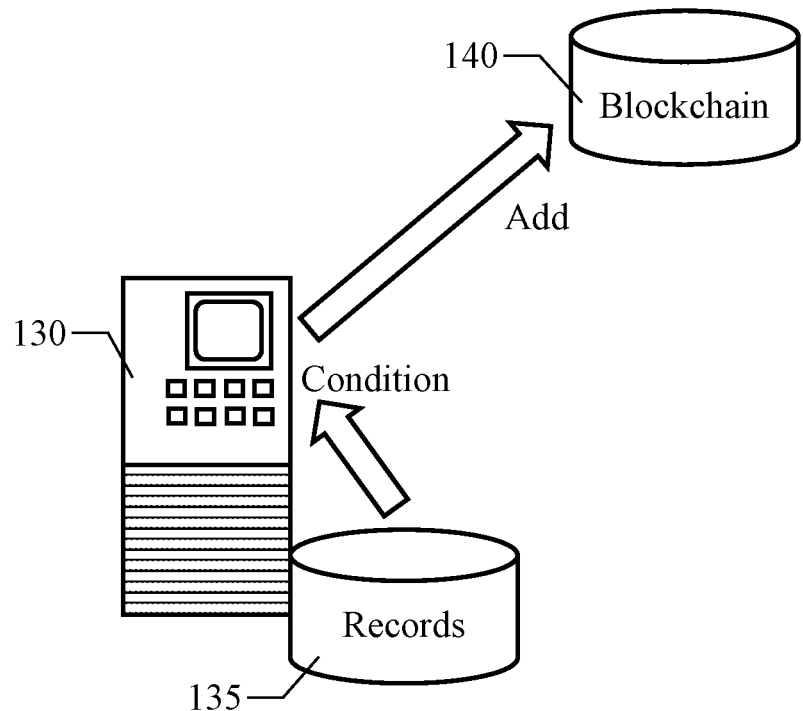

As depicted in FIG. 1F, the servers 130 determine one or more condition indicators of the segment (shown in FIG. 1D) according to the corresponding (validated) monitoring records 135 (for example, based on their average). The condition indicator of the segment 125 may then be added to a blockchain, denoted with the reference 140 (once a consensus is reached among the servers about it). This may trigger one or more actions defined in a smart contract (for example, an intervention on the segment to repair a damage thereof).

The above-described solution allows determining the conditions of a generic location in a collaborative way (by the different mobile computing devices passing through it). This provides high level of reliability in a simple and cost-effective way.

Particularly, this solution significantly mitigates an impact of any outliers in the monitoring values that are collected by the different mobile computing devices (thanks to the filtering of the monitoring records according to their homogeneity). As a consequence, it is possible to provide reliable information about the conditions of the location, especially when heterogeneous sensors are used to collect its monitoring values.

Moreover, the same solution implements a consensus schema among the different mobile computing devices (thanks to the validation of the monitoring records according to their matching). As a consequence, the information about the conditions of the location may be trusted in general terms. Particularly, this provides a sort of certification of the information about the conditions of the location, thereby making it verifiable by any interested subjects. As a result, non-repudiation of the information about the condition of the locations is obtained, so that its validity may not be denied. This is especially important in legal contexts, such as for transactions regulated by smart contracts, for forensic procedures and so on.

With reference now to FIG. 2A-FIG. 2B, FIG. 3A-FIG. 3B and FIG. 4A-FIG. 4B, different examples are shown of an application of the solution according to at least one embodiment of the present invention.

Figure 2A:
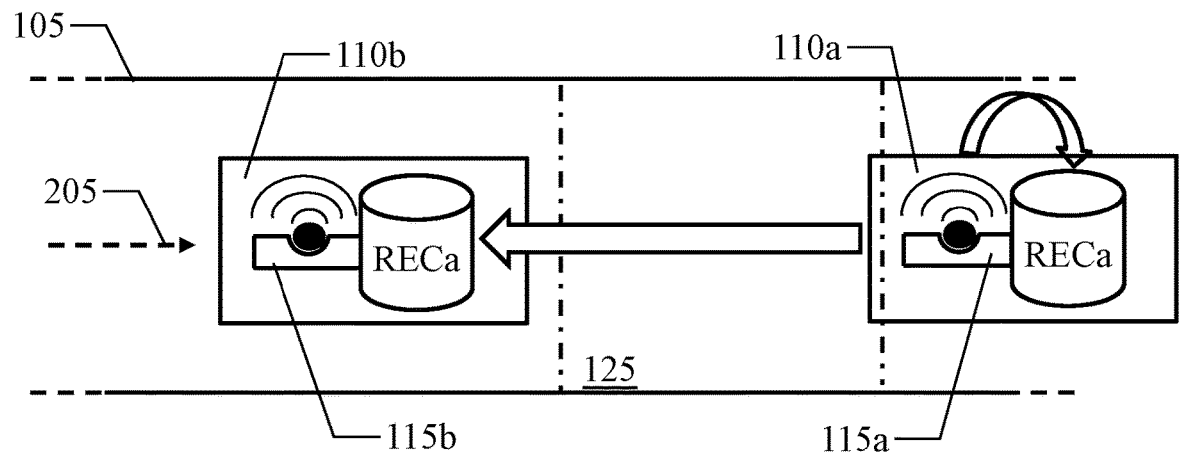
FIG. 2A-FIG. 2B, FIG. 3A-FIG. 3B and FIG. 4A-FIG. 4B show different examples of an application of the solution according to an embodiment of the present disclosure.

As depicted in FIG. 2A, a generic vehicle carrying a corresponding terminal, differentiated with the references 110a and 115a, respectively, has just passed through the segment 125 after collecting and storing the corresponding (collected) monitoring record, denoted with RECa. The terminal 115a transmits the (stored) monitoring record RECa to a terminal mounted on a corresponding vehicle, differentiated with the references 115b and 110b, respectively, that follows the terminal 115a along a travel direction 205 in the road 105, close enough to allow a direct communication between them (for example, at less than 100-300 m); in response thereto, the terminal 115b stores the (received) monitoring record RECa.

Figure 2B:
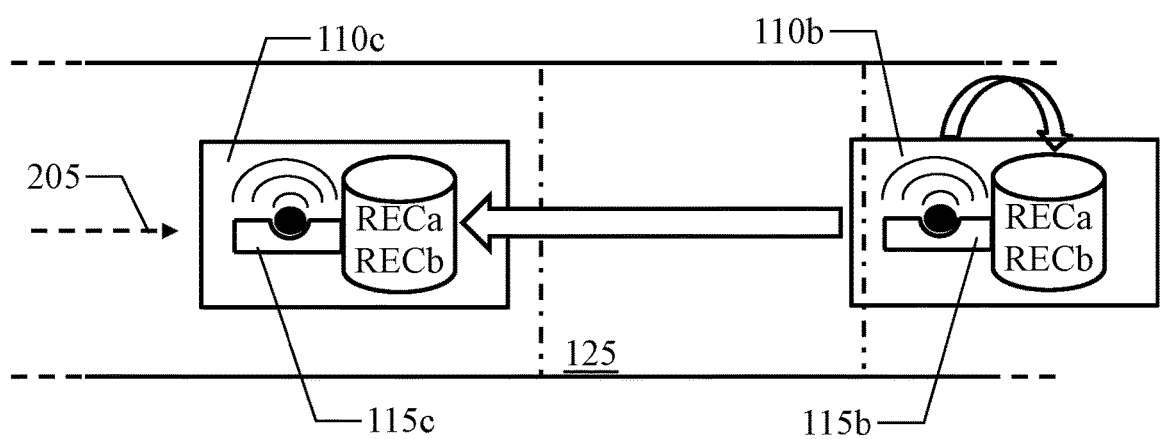

As depicted in FIG. 2B, later on the vehicle 110b carrying the terminal 115b also passes through the segment 125 so as to collect the corresponding (collected) monitoring record, denoted with RECb, which is stored in addition to the (received) monitoring record RECa. The terminal 115b likewise transmits the (stored) monitoring records RECa, RECb to a terminal mounted on a corresponding vehicle, differentiated with the references 115c and 110c, respectively, that follows the terminal 115b along the travel direction 205, which terminal 115c then stores the (received) monitoring records RECa, RECb (with the same operations that are repeated until the monitoring records for the segment 125 that are stored by a terminal reach a sufficient number for their uploading to the server, not shown in the figure).

This implementation is very simple, but at the same time effective (especially in the case of a relatively high traffic road).

Figure 3A:
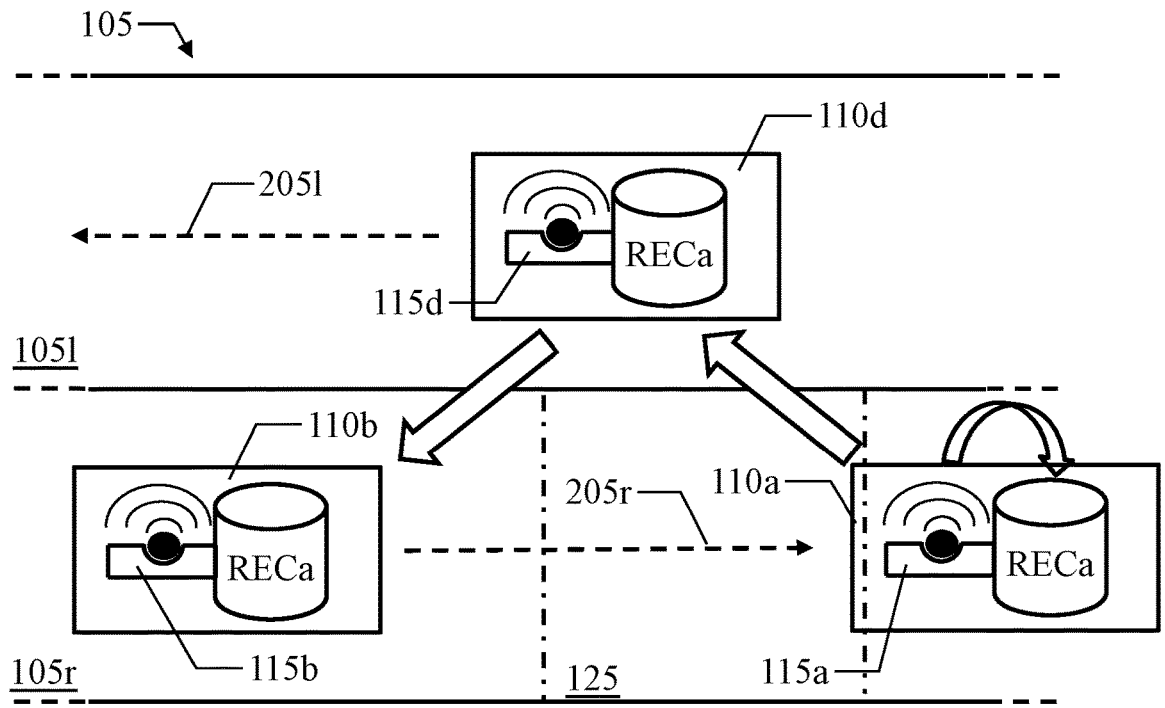

As depicted in FIG. 3A, in this case the road 105 is a two-way road. The vehicle 110a carrying the terminal 115a travels along a direction 205r (rightwards in the figure) in a corresponding lane 105r of the road 105. As above, the vehicle 110a carrying the terminal 115a has just passed through the segment 125 after collecting and storing the corresponding (collected) monitoring record RECa. However, the terminal 115a now transmits the (stored) monitoring record RECa to a terminal mounted on a corresponding vehicle, differentiated with the references 115d and 110d, respectively, that travels along an opposite direction 205l (leftwards in the figure) in another lane 105l of the road 105, which terminal 115d then stores the (received) monitoring record RECa. In turn, the terminal 115d transmits the (stored) monitoring record RECa to the terminal 115b mounted on the vehicle 110b that follows the terminal 115a along the travel direction 205r in the same lane 105r, which terminal 115b then stores the (received) monitoring record RECa. In this way, the monitoring record RECa may be transmitted (indirectly) from the terminal 115a to the terminal 115b even when they are too spaced apart (i.e., above a predetermined distance) to allow a direct communication between them (for example, by more than 100-300 m).

Figure 3B:
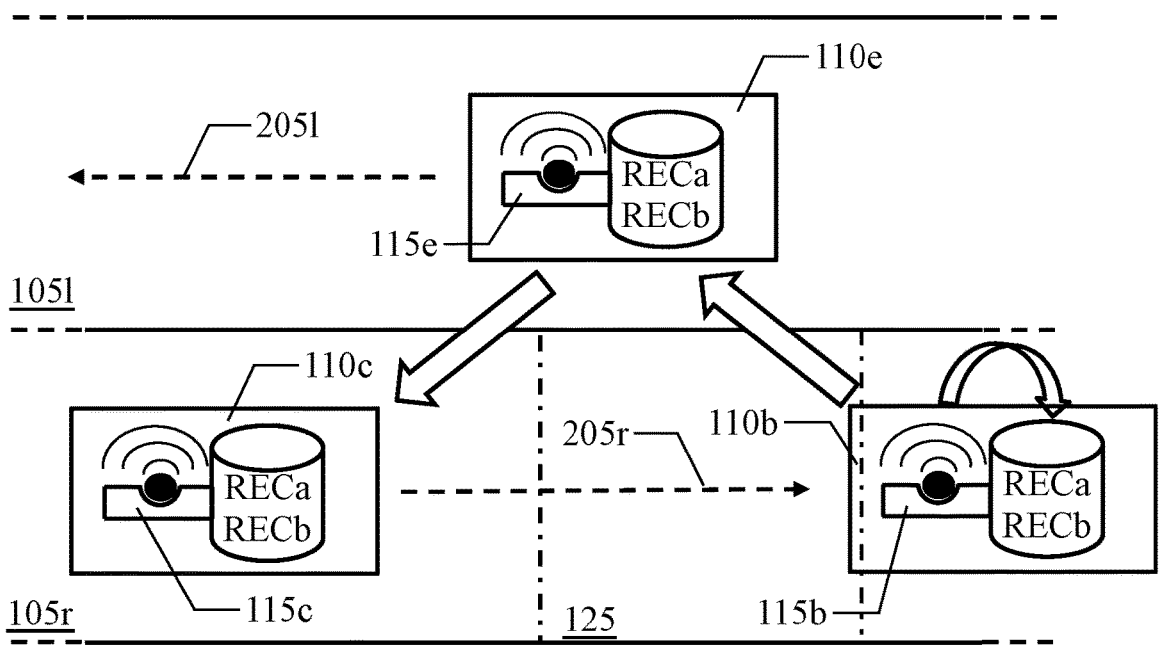

As depicted in FIG. 3B, later on the vehicle 110b carrying the terminal 115b as well passes through the segment 125 so as to collect the corresponding (collected) monitoring record, denoted with RECb, which is stored in addition to the (received) monitoring record RECa. The terminal 115b likewise transmits the (stored) monitoring records RECa, RECb to a terminal mounted on a corresponding vehicle, differentiated with the references 115e and 110e, respectively, that travels along the opposite direction 205l in the other lane 105l. In turn, the terminal 115e transmits the (stored) monitoring records RECa, RECb to the terminal 115c mounted on the vehicle 110c that follows the terminal 115b along the travel direction 205r in the same lane 105r (at relatively high distance), which terminal 115c then stores the (received) monitoring records RECa, RECb (with the same operations that are repeated until the monitoring records for the segment 125 that are stored by a terminal reach a sufficient number for their uploading to the server, not shown in the figure).

This implementation is particularly effective in the case of relatively low road traffic.

Figure 4A:
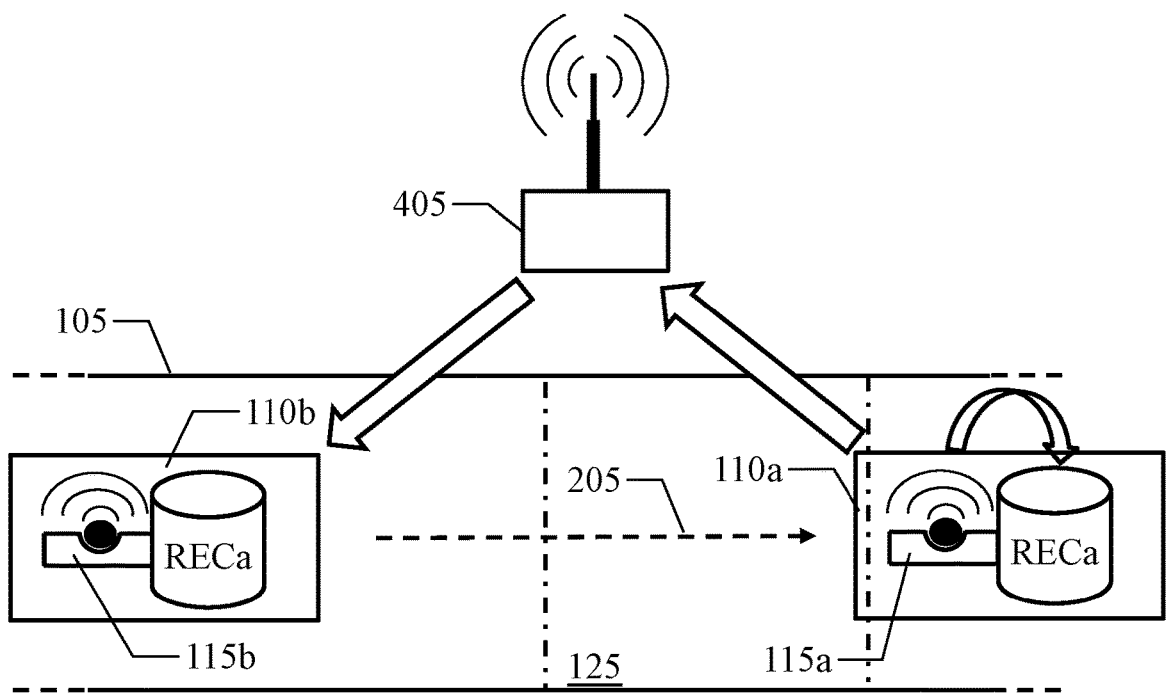

As depicted in FIG. 4A, as above the vehicle 110a carrying the terminal 115a has just passed through the segment 125 after collecting and storing the corresponding (collected) monitoring record RECa. A series of repeaters 405 (only one shown in the figure) are now installed at a side of the road 105 (for example, every 100-500 m). In this case, the terminal 115a transmits the (stored) monitoring record RECa to the closest repeater 405 (at a distance allowing a direct communication with it, for example, at less than 100-300 m). The repeater 405 re-transmits the monitoring record RECa (directly or via one or more other repeaters, not shown in the figure, generally after amplifying a corresponding signal) to the terminal 115b mounted on the vehicle 110b that follows the terminal 115a along the travel direction 205, which terminal 115b then stores the (received) monitoring record RECa. In this way, the monitoring record RECa may be transmitted (indirectly) from the terminal 115a to the terminal 115b even when they are very spaced apart.

Figure 4B:
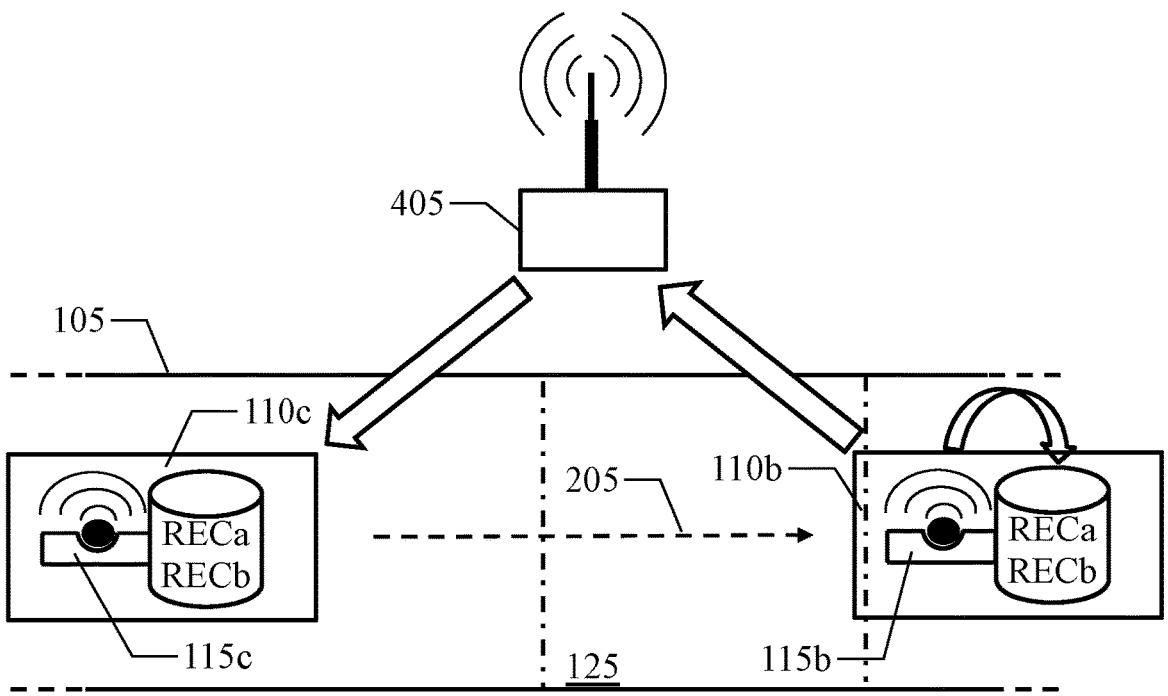

As depicted in FIG. 4B, later on the vehicle 110b carrying the terminal 115b also passes through the segment 125 so as to collect the corresponding (collected) monitoring record, denoted with RECb, which is stored in addition to the (received) monitoring record RECa. The terminal 115b likewise transmits the (stored) monitoring records RECa, RECb to the repeater 405 on road 105; the repeater 405 re-transmits the monitoring records RECa, RECb to the terminal 115c mounted on the vehicle 110c that follows the terminal 115b along the travel direction 205 (at quite high distance), which terminal 115c then stores the (received) monitoring records RECa, RECb (with the same operations that are repeated until the monitoring records for the segment 125 that are stored by a terminal reach a sufficient number for their uploading to the server, not shown in the figure).

This implementation is particularly effective in the case of quite low road traffic.

The above-mentioned techniques may be combined among them in any way to obtain a synergic effect. For example, the monitoring records may be broadcast to vehicles that follow one another, vehicles that are travelling in the opposite direction of each other, and to repeaters in those scenarios in which a very high accuracy and/or fast detection of the conditions of the road are required.

Figure 5:
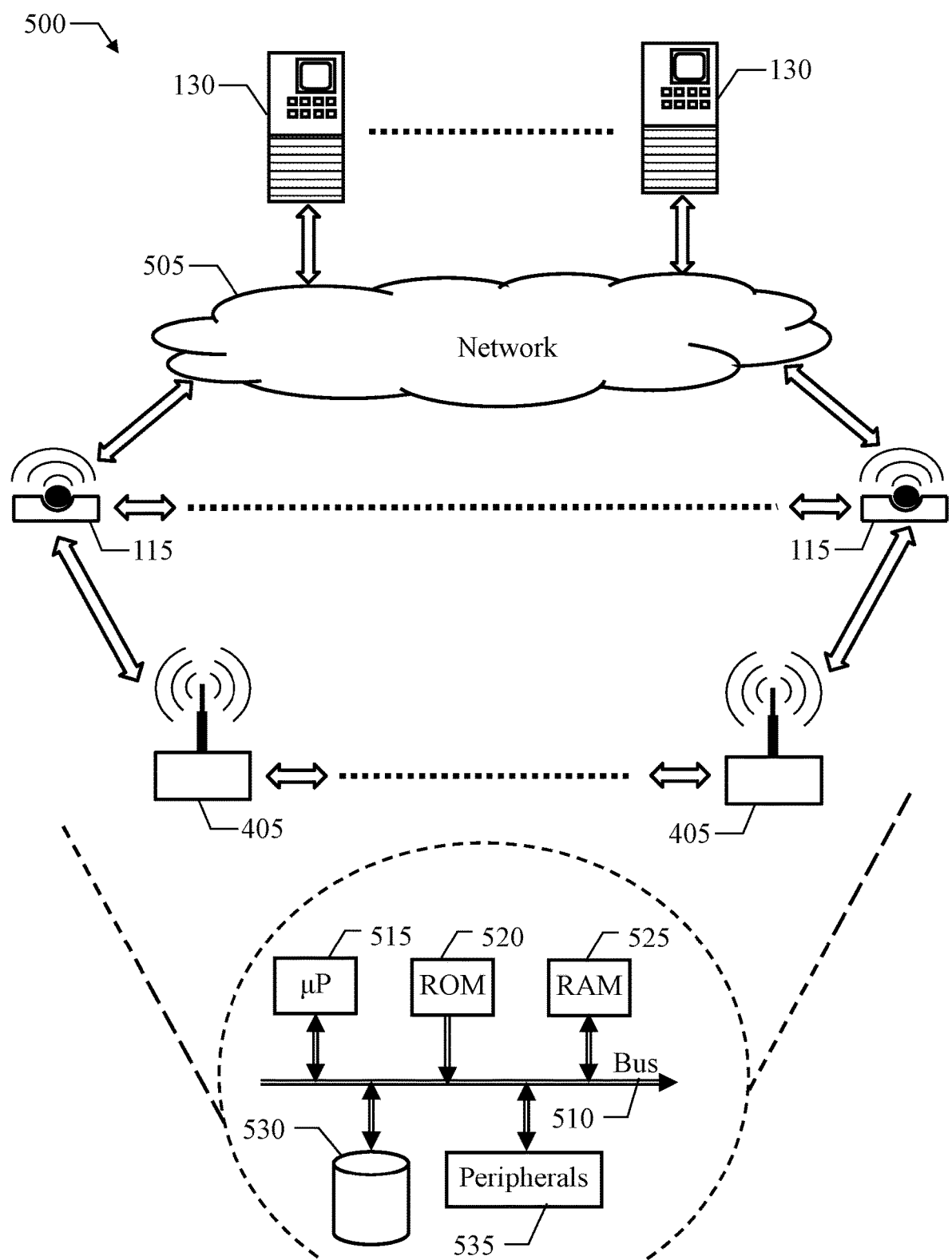
FIG. 5 shows a schematic block diagram of an information technology infrastructure that may be used to implement the solution according to an embodiment of the present disclosure.

With reference to FIG. 5, a schematic block diagram is shown of an information technology infrastructure 500 that may be used to implement the solution according to an embodiment of the present disclosure.

The (information technology) infrastructure 500 is used to monitor one or more locations; for example, each location is a road, a bike/hiking path, a pedestrian zone (street/square), a mall, an airport, a station and so on. The infrastructure 500 comprises the above-mentioned terminals 115, servers 130 and possible repeaters 405. The terminals 115 are dedicated controllers, smartphones, tablets and so on, which are carried by vehicles, bikers, runners, walking persons and so on. The servers 130 are nodes of a blockchain network. The terminals 115 communicate among them through a Vehicle-To-Vehicle (V2V) communication based on Dedicated Short-Range Communication (DSRC) techniques. The terminals 115 also communicate with the server 130, for example, through a global network 505 based on the Internet that is accessed via 35-5G connections. Moreover, the terminals 115 also communicate with the repeaters 405 (when they are present) through Vehicle-To-Infrastructure (V2I) communication, for example, based on WLAN techniques. The repeaters 405 may also communicate among them (for example, via a wired connection) so as to distribute the monitoring records accordingly.

Each of the above-described computing machines (i.e., terminals 115 and servers 130) comprise several units that are connected among them through a bus structure 510 at one or more levels (with an architecture that is suitably scaled according to the type of the computing machine 115, 130). Particularly, one or more microprocessors (uPs) 515 provide a logic capability of the computing machine 115, 130; a non-volatile memory (ROM) 520 stores basic code for a bootstrap of the computing machine 115, 130 and a volatile memory (RAM) 525 is used as a working memory by the microprocessor 515. The computing machine 115, 130 is provided with a mass-memory 530 for storing programs and data (for example, a flash E$^2$PROM for each terminal 115 and storage devices of a data center wherein it is implemented for each server 130). Moreover, the computing machine 115, 130 comprises a number of controllers for peripherals, or Input/Output (I/O) units, 535; for example, the peripherals 535 of each terminal 115 comprise a GPS receiver for detecting its position, one or more sensors for collecting the monitoring values (for example, an accelerometer, a microphone, a camera and so on), a DSRC device for communicating with the other terminals 115, a 3G-5G transceiver (TX/RX) for accessing the network 505, and particularly for communicating with the servers 130, and a possible WLAN card for communicating with the repeaters 405, whereas the peripherals 535 of each server 130 comprise a network card for plugging the server 130 into the corresponding data center and then connecting it to a console of the data center for its control (for example, a personal computer, also provided with a drive for reading/writing removable storage units, such as of USB type) and to a switch/router sub-system of the data center for accessing the network 505.

Figure 6:
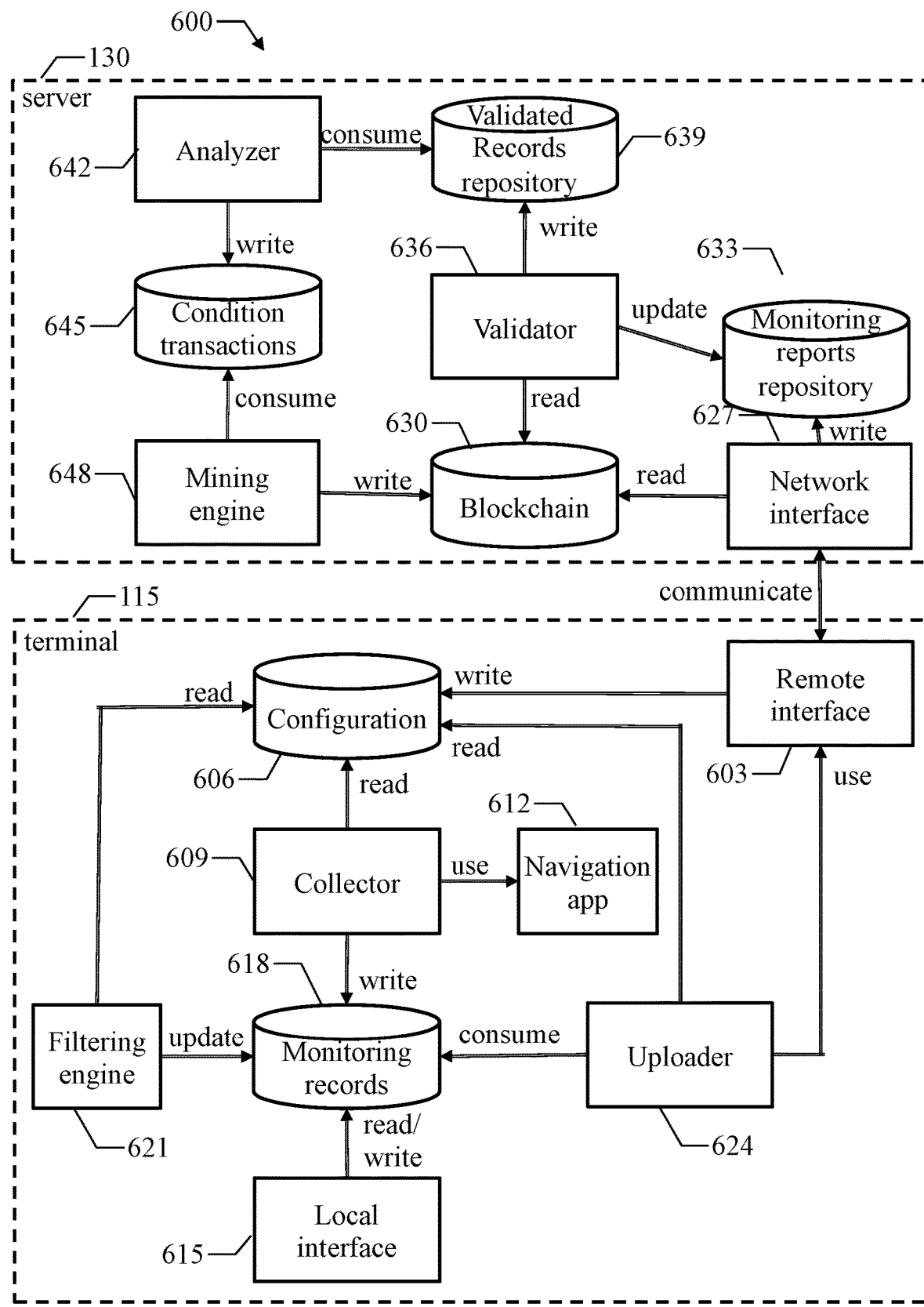
FIG. 6 shows the main software components that may be used to implement the solution according to an embodiment of the present disclosure.
Figure 7A:
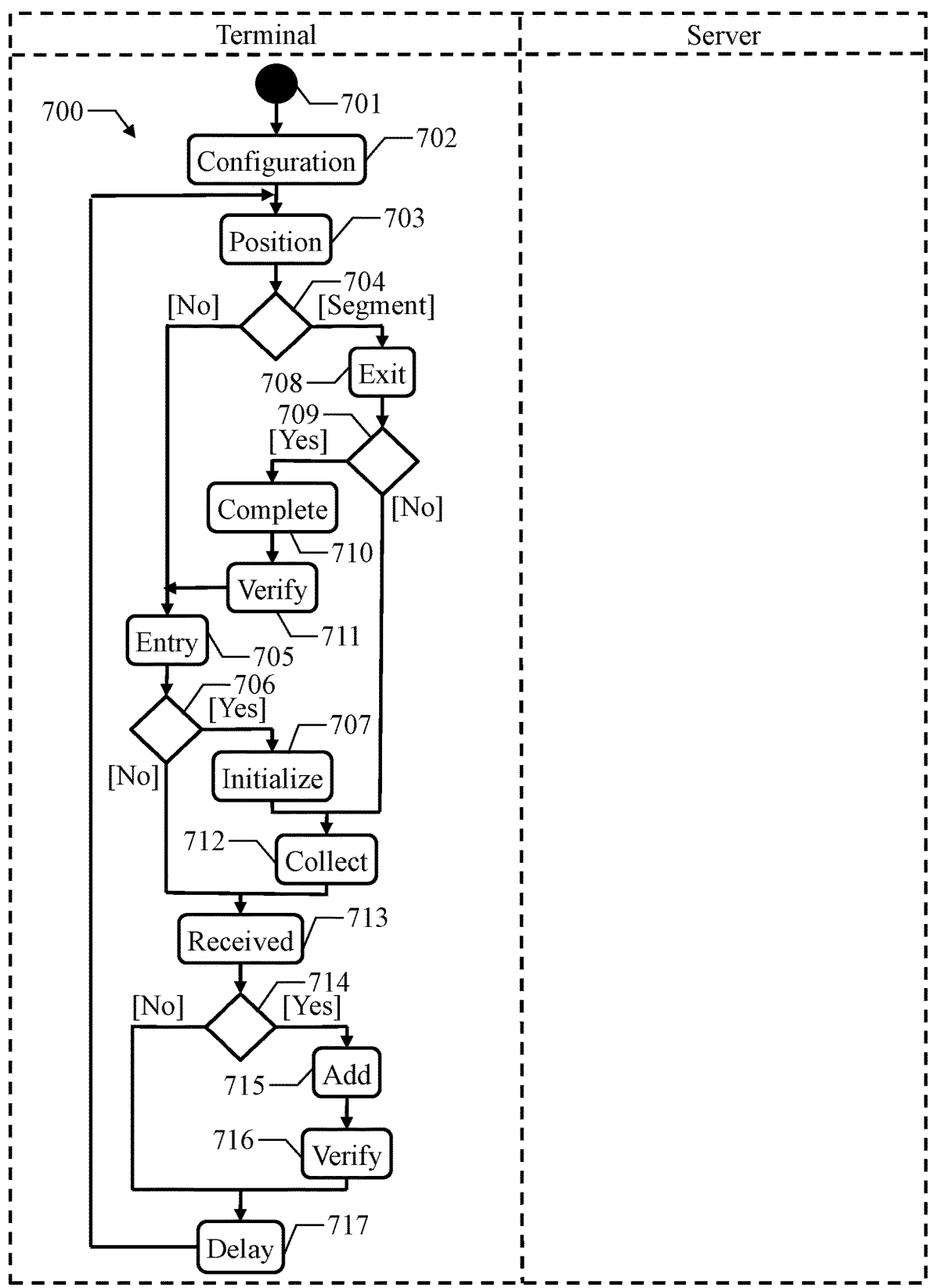
FIG. 7A-FIG. 7D show an activity diagram describing the flow of activities relating to an implementation of the solution according to an embodiment of the present disclosure.
Figure 7B:
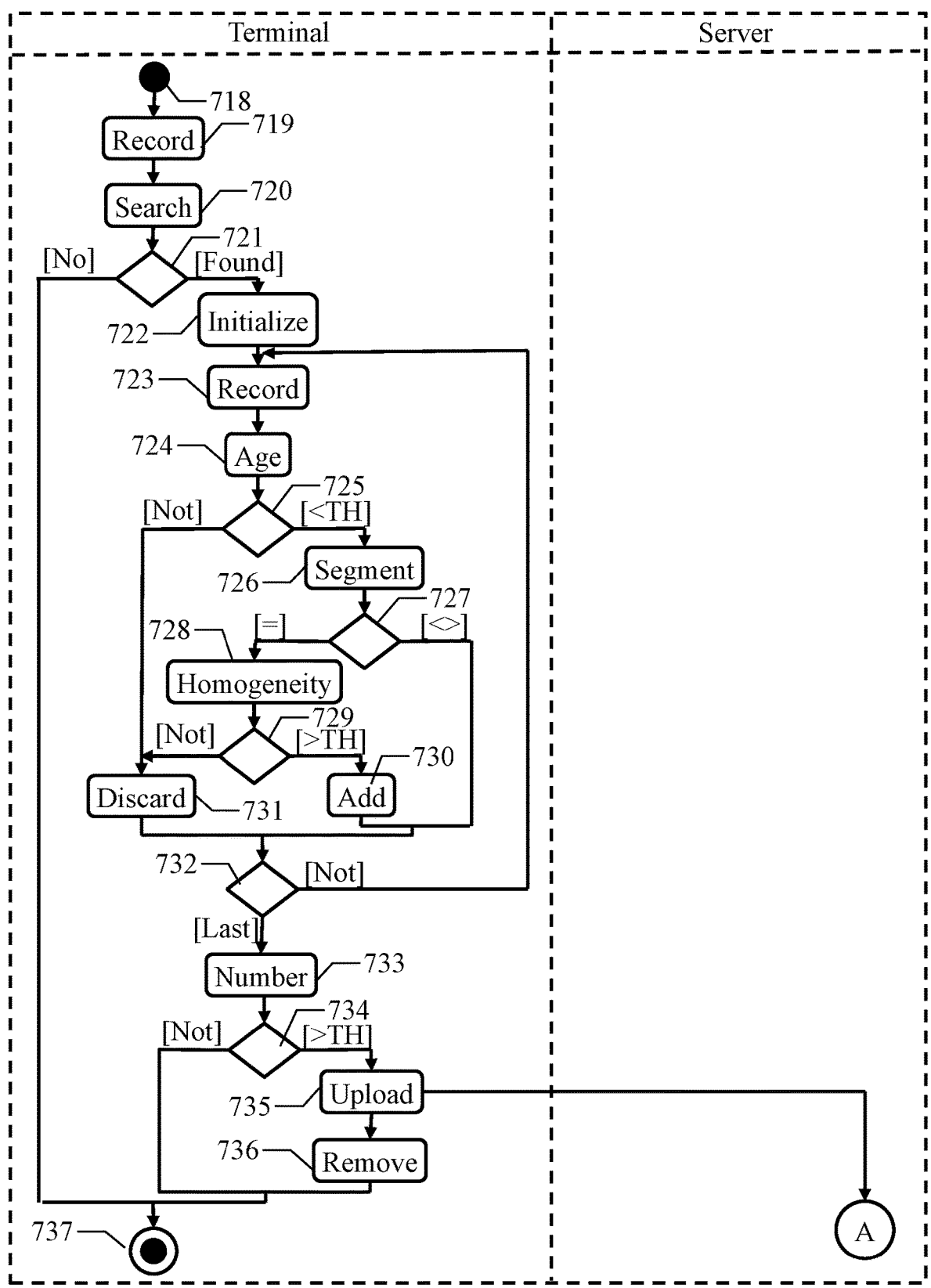
Figure 7C:
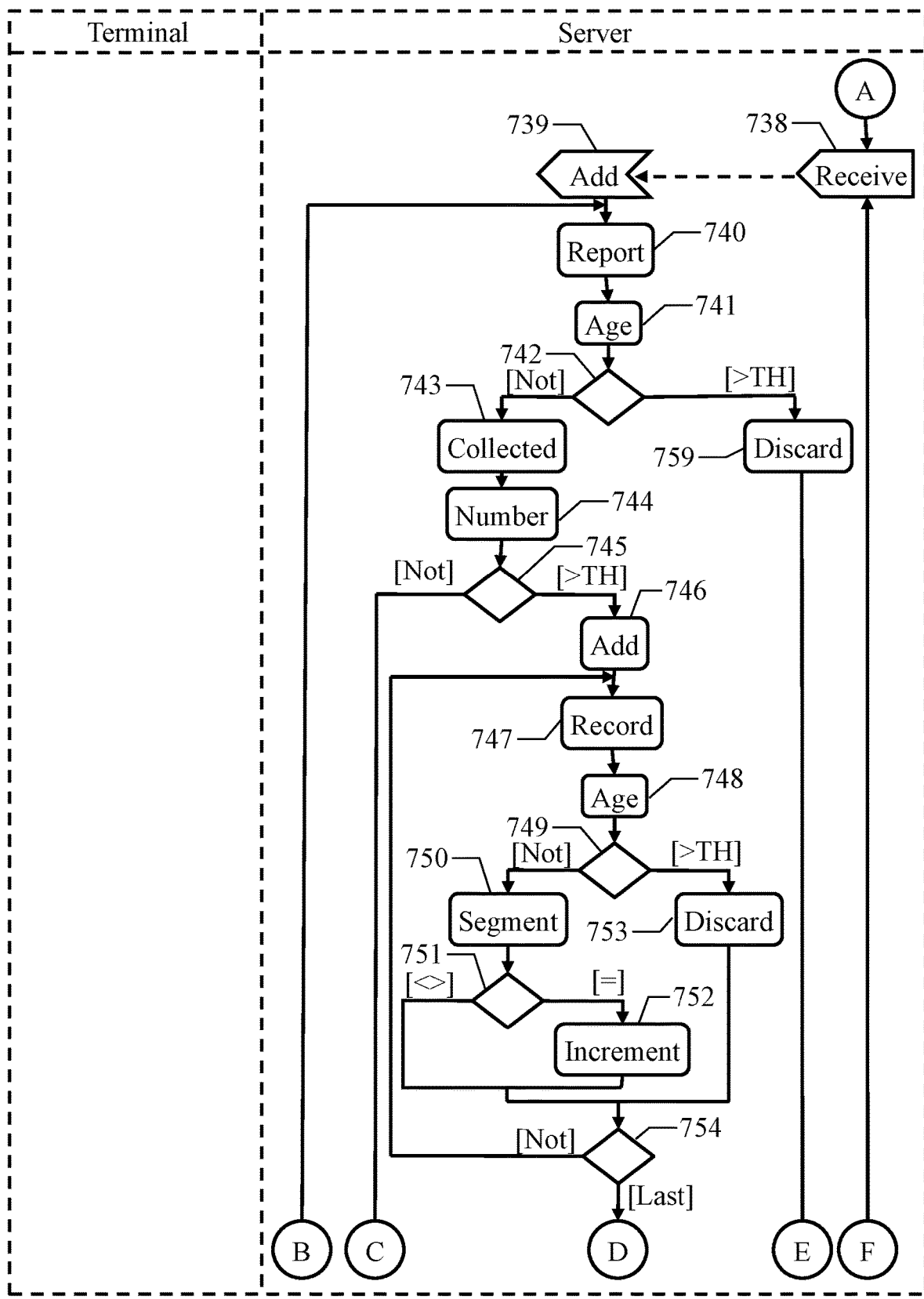
Figure 7D:
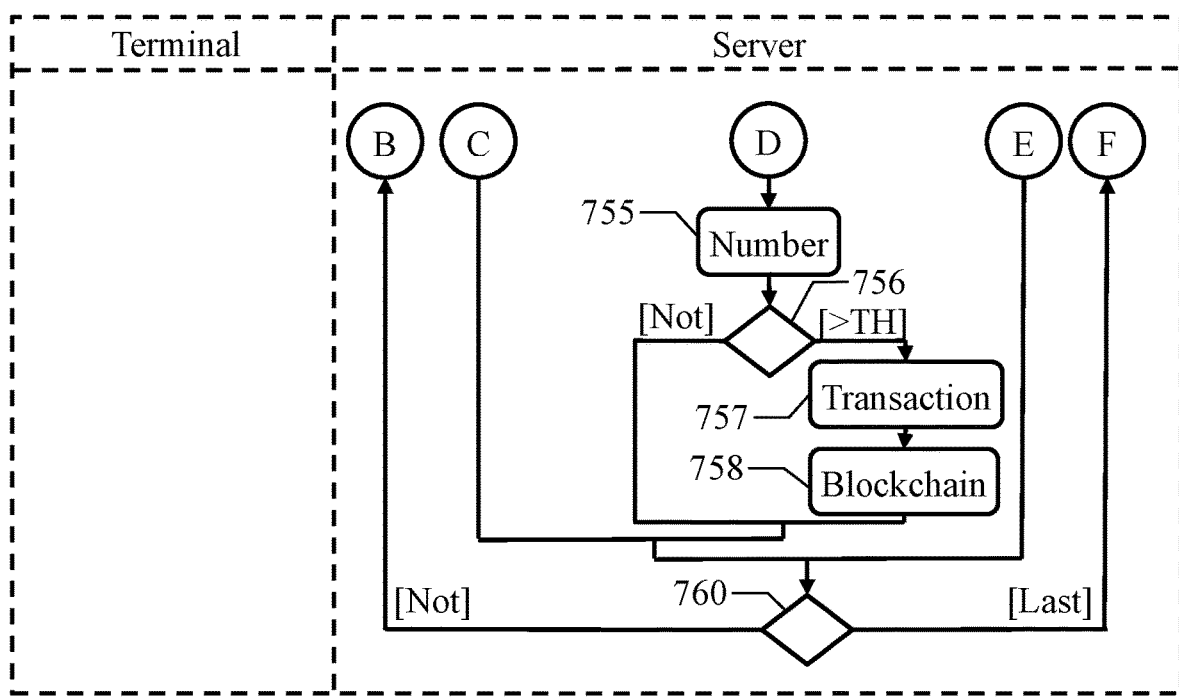

As depicted in FIG. 6, the main software components are shown that may be used to implement the solution according to an embodiment of the present disclosure.

Particularly, all the software components (programs and data) are denoted as a whole with the reference 600. The software components 600 are typically stored in the mass memory and loaded (at least partially) into the working memory of each computing machine (terminals 115 and servers 130) when the programs are running, together with possible other software programs not directly relevant to the solution of the present disclosure (thus omitted in the figure for the sake of simplicity). The programs are installed into the mass memory, for example, from removable storage units or from the network (not shown in the figure). In this respect, each program may be a module, segment or portion of code, which comprises one or more executable instructions for implementing the specified logical function.

Starting from each terminal 115 (only one shown in the figure), it comprises the following components. A remote interface 603 drives the 3G-5G transceiver for communicating with the servers 130 over the Internet. The remote interface 603 writes a configuration repository 606 that contains configuration information for monitoring the roads. Particularly, the configuration information repository 606 comprises a (unique) identifier of the terminal, an indication of corresponding (sensor) types of one or more sensors to be used to collect the monitoring values, a collection frequency of the monitoring values, a definition of the segments of the roads to be monitored and an uploading policy of the monitoring records. The definition of the segments comprises an entry for each segment; the entry stores a (unique) identifier of the segment and its start point and end point (defined by corresponding coordinates in a map). The uploading policy comprises a storing age threshold for discarding the older monitoring records being stored (for example, 1-24 hours), a homogeneity threshold for filtering the (non-homogeneous) monitoring records of each segment (for example, 0.2-0.5 for values ranging from 0 to 1) and an uploading threshold for the number of (filtered) monitoring records of each segment that are required for uploading them to the server 130 (for example, 10-100). The uploading policy may be defined either globally (the same for all the segments) and/or individually (different for each of them or groups thereof). A collector 609 is used to collect the monitoring values (by driving the corresponding sensors of the terminal 115). The collector 609 reads the configuration repository 606. The collector 609 uses a navigation app 612, which provides services for aiding a driver of the corresponding vehicle to reach a desired destination (by driving the GPS receiver for determining the (current) position of the terminal 115 and storing a map of an area of interest with a definition of its roads). A local interface 615 drives the DSRC device for communicating with the other terminals 115 and the possible WLAN card for communicating with the repeaters (not shown in the figure). The collector 609 writes and the local interface 615 reads/writes a monitoring records repository 618. The monitoring records repository 618 stores the (most recent) monitoring records that have been collected/received by the terminal 115. Each monitoring record contains the identifier of the terminal that has collected it, the identifier of the corresponding segment, a (collection) time of its collection and a list of one or more tuples each containing a monitoring value, the sensor type of the sensor used to collect it and a (collection) position of the terminal when it has been collected. For example, each monitoring value measures frequency/amplitude of vibrations, magnitude of shocks, volume of sounds, obstacles being recognized in images and so on. A filtering engine 621 filters the (stored) monitoring records according to their homogeneity. The filtering engine 621 reads the configuration repository 606 and its updates the monitoring records repository 618. An uploader 624 uploads the (filtered) monitoring records to the servers 130. The uploader 624 reads the configuration repository 606 and it consumes the monitoring records repository 618; moreover, the uploader 624 uses the remote interface 603.

Moving to each server 130 (only one shown in the figure), it operates as a miner that adds new blocks to a blockchain (being of permissionless, or public, type). In general, a blockchain is a distributed ledger that stores information (in the form of transactions). A blockchain is a growing list of records, called blocks, that are linked together using cryptography. Each block contains a cryptographic hash of the previous block, a timestamp, and transaction data. Smart contracts are proposed contracts that can be partially or fully executed or enforced without human interaction. One of the main objectives of a smart contract is automated escrow. A key feature of smart contracts is that they do not need a trusted third party (such as a trustee) to act as an intermediary between contracting entities—the blockchain network executes the contract on its own.

The transactions are stored into a sequence of blocks in chronological order; the blocks are linked to each other via corresponding hash values determined by solving a complex mathematical problem, so as to make more and more computational difficult to alter a block as the number of further blocks following it in the blockchain increases. The blockchain is distributed throughout peer-to-peer nodes of the corresponding network, which nodes validate its content according to a consensus schema that determines the valid version of the blockchain (with no centralized version of the blockchain that exists and no node that is more trusted than any other node is). In a permissionless (or public) blockchain no control exists on the access to the blockchain; in this case, a proof of work schema is implemented wherein the miners are remunerated for their work in solving the mathematical problems required for adding the blocks to the blockchain. Particularly, the blockchain may be used to define smart contracts. In general, a smart contract is a computer-implemented procedure that automatically execute actions in response to events according to terms of a contract defined therein. A smart contract being implemented in a blockchain is deployed by storing its instructions (signed by all the involved parties) into the blockchain. The smart contract may be invoked by submitting corresponding transactions to the blockchain; these transactions define corresponding events that are managed by the smart contract according to its definition. In the solution according to an embodiment of the present disclosure, the smart contract relates to a location (or more) through which the terminals may travel. The smart contract is among two or more stakeholders of the location (for example, municipalities, maintainers, contractors, users, citizens and so on). The smart contact responds to events defined according to the conditions of the location (for example, damage, traffic, accident, dirt, criminal act and so on). The events trigger different actions relating to the location (for example, interventions, alarms, payments and so on).

Particularly, the server 130 comprises the following components. A network interface 627 is used to communicate with the terminals 115 over the Internet. The network interface 627 reads a blockchain repository 630, which stores a version of the blockchain that is currently known to the server 130. As far as relevant to the present disclosure, the blockchain stores the smart contract (or more) for controlling the monitoring of the roads. Particularly, the smart contract contains the definition of the segments of the roads to be monitored and their monitoring policy as above. Moreover, the smart contract contains a processing policy of the monitoring records; the processing policy comprises an uploading age threshold for discarding the older monitoring records being uploaded (for example, 1-24 hours), a matching threshold for the number of received monitoring records that match each collected monitoring record being required for its validation (for example, 10-100), an aggregation threshold for the number of monitoring records being validated that are required for determining the condition indicator of the segment according to their aggregation (for example, 10-100) and an aggregation procedure for calculating the condition indicators. The processing policy may be defined either globally (the same for all the segments) and/or individually (different for each of them or groups thereof). The parameters defining the monitoring policy and the processing policy may be pre-defined and/or depending on dynamic conditions, such as sensor types, quality of the sensors, nature of the location (such one-way/two-way road, presence of repeaters and their possible connection), frequency of terminals passing through the segments, frequency of monitoring records being uploaded and so on). The network interface 627 writes a monitoring reports repository 633. The monitoring reports repository 633 stores (most recent) monitoring reports relating to corresponding uploading operations of the monitoring records to the server 130. Particularly, each monitoring report contains the identifier of the terminal that has uploaded it, the identifier of the corresponding segment, an (uploading) time of its uploading and a plurality of monitoring records of the segment (comprising at least one collected monitoring record and one or more received monitoring records being collected and received, respectively, by the corresponding terminal). A validator 636 validates the (uploaded) monitoring records of each segment according to their matching. The validator 636 reads the blockchain repository 630 and it updates the monitoring reports repository 633. Moreover, the validator writes a validated records repository 639. The validated records repository 639 contains validated records corresponding to the monitoring records that have been validated. Each validated record comprises the identifier of the segment, the collection time and the tuples (monitoring value, sensor type and collection position) of the corresponding monitoring record. An analyzer 642 analyzes the validated records of each segment to determine its condition indicators (for example, by applying artificial intelligence techniques). The condition indicators are indicative of corresponding properties of the segment (for example, an index measuring a smoothness of its road surface, an index measuring an intensity of its traffic, a flag indicting the presence of obstacles and so on). The analyzer consumes the validated records repository 639 and it writes a condition transactions repository 645. The condition transactions repository 645 contains (condition) transactions relating to the conditions of the segments that are still to be added to the blockchain. Each condition transaction contains the identifier of the corresponding segment, the condition indicator of the segment and a (determination) period of its determination. A mining engine 648 performs mining operations for adding blocks to the blockchain. As far as relevant to the present disclosure, the mining engine 648 adds blocks containing the condition transactions (defining corresponding events of the smart contract for monitoring the roads). The mining engine 648 consumes the condition transactions repository 645 and it writes the blockchain repository 630.

With reference now to FIG. 7A-FIG. 7D, an activity diagram is shown describing the flow of activities relating to an implementation of the solution according to an embodiment of the present disclosure.

The diagram represents an exemplary process that may be used to monitor one or more roads with a method 700. In this respect, each block may correspond to one or more executable instructions for implementing the specified logical function on the corresponding computing machine (terminals and servers).

Particularly, the swim-lane is shown of a generic terminal that is registered in the smart contract (which smart contract has assigned the corresponding identifier to the terminal in a completely anonymous way, has determined its sensors types and has downloaded this information to the configuration repository of the terminal). The process begins at black start circle 701 in the swim-lane of the terminal and passes to block 702 when the terminal is turned on (for example, at the start of the vehicle carrying it). At this point, the remote interface downloads the collection frequency, the definition of the segments (identifier, start point and end point of each segment) and the uploading policy (storing age threshold, homogeneity threshold and uploading threshold) from the blockchain (as defined in the smart contract) and updates the configuration repository accordingly. The collector at block 703 determines the (current) position of the terminal via the navigation app.

The flow of activity branches at block 704 according to a (collection) state of the terminal. If the terminal is not collecting the monitoring values of any segment, the collector at block 705 verifies an entry into any segment; for this purpose, the collector uses the navigation app to verify whether a travel of the terminal in the map from its previous position (saved in a corresponding variable) to its current position has passed through the start point of any segment (as defined in the configuration repository). The flow of activity branches at block 706 according to a result of this verification. If the terminal has entered into a (new) segment, the collector at block 707 initializes the collection of its monitoring values, by adding a new entry for its monitoring record to the corresponding repository containing the identifier of the terminal and the identifier of the new segment (retrieved from the configuration repository), and the collection time (equal to a current time determined from a system clock). Referring back to block 704, if the terminal is already collecting the monitoring values of a (current) segment, the collector at block 708 verifies an exit from the current segment; for this purpose, the collector uses the navigation app to verify whether the travel of the terminal in the map from its previous position to its current position has passed through the end point of the current segment (retrieved from the configuration repository). The flow of activity branches at block 709 according to a result of this verification. If the terminal has left the current segment, the collector at block 710 marks the corresponding monitoring record as being complete. The collector at block 711 invokes a verification procedure (described in the following) for verifying whether an uploading operation has to be performed based on the (completed) monitoring record. The process then continues to block 705 to verify as above whether the terminal has entered into a (new) segment at the same time. The flow of activity merges again at block 712 from block 707 or from block 709 if the terminal is still in the current segment. At this point, the collector commands each sensor (whose type is indicated in the configuration repository) to collect a (new) monitoring value of the current segment; the collector adds a corresponding (new) tuple (containing the monitoring value, the corresponding sensor type and the collection position set to the current position of the terminal) to the new monitoring record of the current segment. The process then continues to block 713; the same point is also reached directly from block 706 if the terminal has not entered any new segment. The local interface now verifies whether any monitoring record has been received from the other terminals (being saved into a corresponding buffer). The flow of activity branches at block 714 according to a result of this verification. If one or more monitoring records have been received, the following operations are executed for each of them (in chronological order of their receiving). Particularly, the local interface at block 715 adds the received monitoring record to the corresponding repository. The local interface at block 716 invokes the verification procedure (described in the following) for verifying whether an uploading operation has to be performed based on the received monitoring record. The process then continues to block 717. The same point is also reached directly from block 714 if no monitoring record has been received. At this point, the collector waits for a period corresponding to the collection frequency (retrieved from the configuration repository) and then returns to block 703 to repeat the same operations continually.

The verification procedure begins at black start circle 718 and passes to block 719 wherein the (relevant) monitoring record to be verified is received as parameter (being the monitoring record just collected from block 711 or each monitoring record just received from block 716). The filtering engine at block 720 scans the monitoring records repository backwards searching for the most recent monitoring record that has been collected by the terminal for the same segment of the relevant monitoring record. The flow of activity branches at block 721 according to a result of this search. If the (most recent) collected monitoring record has been found, the filtering engine at block 722 initializes a homogeneity list by adding a pointer to the collected monitoring record in the corresponding repository. A loop is then entered at block 723, wherein the filtering engine takes a (current) monitoring record of the corresponding repository into account (starting from a first one in any arbitrary order). The filtering engine at block 724 calculates an age of the current monitoring record, as a difference between the current time and the collection time of the current monitoring record, and compares it with the storing age threshold (retrieved from the configuration repository). The flow of activity branches at block 725 according to a result of this comparison. If the age of the current monitoring record is (possibly strictly) lower than the storing age threshold, the filtering engine at block 726 compares the segment identifier of the current monitoring record with the segment identifier of the relevant monitoring record. The flow of activity branches at block 727 according to a result of this comparison. If both the current/relevant monitoring records relate to the same (relevant) segment, the filtering engine at block 728 calculates a homogeneity index between the current monitoring record and the collected monitoring record (indicated at the beginning of the homogeneity list).

For example, for this purpose the filtering engine analyzes the current monitoring record and the collected monitoring record to determine the sensor types that are common between them (i.e., sensors of the same types have been used to collect monitoring values in both the current monitoring record and the collected monitoring record). For each (common) sensor type, the filtering engine scans the collected monitoring record to identify its monitoring values that have been collected by the corresponding sensor. For each of these monitoring values, the filtering engine determines a corresponding monitoring value in the current monitoring record; the monitoring value in the current monitoring record is the one that has been collected with the sensor of the same type at a collection position that is the closest one to the collection position of the monitoring value in the collected monitoring record. For each (monitoring value) pair, formed by these corresponding monitoring values in the collected monitoring record and in the current monitoring record, the filtering engine then calculates a monitoring value ratio as:

$$Rmv(i) = \frac{Lmv(i)}{Hmv(i)},$$

wherein Rmv(i) is the monitoring value ratio of the i-th monitoring value pair, Lmv(i) is the lower monitoring value of the monitoring value pair and Hmv(i) is the higher monitoring value of the monitoring value pair (so that 0≤Rmv(i)≤1). The filtering engine calculates a homogeneity component for the common sensor type as:

$$Hsen(j) = \sum_{i=1}^{Nval} \frac{Rmv(i)}{Nval},$$

wherein Hsen(j) is the homogeneity component of the j-th common sensor type and Nval is a total number of the corresponding monitoring value pairs (again with 0≤Hsen(j)≤1). In the end, the filtering engine calculates the homogeneity index as:

$$Htot = \sum_{j=1}^{Nsen} \frac{Hsen(j)}{Nsen},$$

wherein Htot is the homogeneity index and Nsen is a total number of the common sensor types (again with 0≤Htot≤1, with the higher the homogeneity index the higher the homogeneity between the current monitoring record and the collected monitoring record).

The flow of activity branches at block 729 according to the homogeneity index. If the homogeneity index is (possibly strictly) higher than the homogeneity threshold (retrieved from the configuration repository), the filtering engine at block 730 adds a pointer to the current monitoring record in the corresponding repository to the homogeneity list. Referring back to block 725, if the age of the current monitoring record is not (possibly strictly) higher than the storing age threshold, the process continues to block 731; the same point is also reached from block 729 if the homogeneity index is (possibly strictly) not higher than the homogeneity threshold. In both cases, the filtering engine discards the current monitoring record by removing it from the corresponding repository. In this way, in the first case it is possible to disregard the monitoring records that are too old and then likely to be not relevant any longer; likewise, in the second case it is possible to disregard the monitoring records of each segment that are not consistent with the (most recent) monitoring record that has been collected for the same segment by the terminal. The flow of activity merges again at block 732 from block 730, from block 731 or directly from block 727 if the current monitoring record relates to a segment different from the one of the relevant monitoring record. At this point, the filtering engine verifies whether a last monitoring record in the corresponding repository has been processed. If not, the process returns to block 723 to repeat the same operations on a next monitoring record. Conversely (once all the monitoring records have been processed) the loop is exited by descending into block 733. At this point, the uploader determines a (homogeneity) number of the (homogeneous) monitoring records of the relevant segment as indicated in the homogeneity list. The flow of activity branches at block 734 according to a comparison between the homogeneity number and the uploading threshold (retrieved from the configuration repository). If the homogeneity number is (possibly strictly) higher than the uploading threshold, the uploader at block 735 creates a (new) monitoring report containing the identifier of the terminal (retrieved from the corresponding repository), the identifier of the relevant segment, the uploading time (set to null) and the homogeneous monitoring records (as indicated in the corresponding list); the uploader then invokes the smart contract for uploading the new monitoring report to the blockchain (via the remote interface). Once the operation has been successfully completed, the uploader at block 736 removes the (uploaded) homogeneous monitoring records from the corresponding repository. In this way, connection to the Internet may be required only for uploading the monitoring reports to the server; this makes the above-described solution of general applicability, even when continuous Internet connection is not available (for example, in semi-isolated situations). The verification procedure then ends at concentric white/black stop circles 737 from block 736, directly from block 734 if the homogeneity number is (possibly strictly) lower than the uploading threshold or directly from block 721 if no monitoring record being collected by the terminal for the same segment of the relevant monitoring record has been found.

Moving to the swim-lane of a generic server, the process passes from block 738 to block 739 as soon as the network interface (being in a waiting condition for it) receives a (new) monitoring report from a generic terminal (at block 735). In response thereto, the network interface adds the new monitoring report to the corresponding repository, after setting its uploading time to a current time determined from a system clock. A loop is then entered at block 740, wherein the validator takes a (current) monitoring report of the corresponding repository into account (starting from a first one in any arbitrary order). The validator at block 741 calculates an age of the current monitoring report, as a difference between the current time and the uploading time of the current monitoring report, and compares it with the uploading age threshold (indicated in the smart contract). The flow of activity branches at block 742 according to a result of this comparison. If the age of the current monitoring report is (possibly strictly) lower than the uploading age threshold, the validator at block 743 takes into account the (collected) monitoring record being collected by the terminal of the monitoring report (the first one thereof). The validator at block 744 scans the monitoring reports repository to determine a (matching) number of the other monitoring reports that contain a (received) monitoring record that matches the collected monitoring record, i.e., a monitoring record relating to the same segment that has been received by the same terminal of the collected monitoring record and that has exactly the same content (collection time and tuples of monitoring value, sensor type, collection position) as the collected monitoring record. The flow of activity branches at block 745 according to a comparison of the matching number with the matching threshold (as indicated in the smart contract). If the matching number is (possibly strictly) higher than the matching threshold, the validator at block 746 adds a (new) validated record corresponding to the collected monitoring record to the corresponding repository (containing its identifier of the segment, collection time and tuples of monitoring value, sensor type, collection position); at the same time, the analyzer initializes an aggregation list by adding a pointer to the new validated record in the corresponding repository. A further loop is then entered at block 747, wherein the analyzer takes a (current) validated record into account of the corresponding repository being different from the new validated record (starting from a first one in any arbitrary order). The analyzer at block 748 calculates an age of the current validated record, as a difference between the current time and its collection time, and compares it with the uploading age threshold. The flow of activity branches at block 749 according to a result of this comparison. If the age of the current validated record is (possibly strictly) lower than the uploading age threshold, the analyzer at block 750 compares the segment indicator of the current validated record with the segment indicator of the new validated record. The flow of activity branches at block 751 according to a result of this comparison. If the current validated record relates to the same segment of the new validated record, the analyzer at block 752 adds a pointer to the current validated record in the corresponding repository to the aggregation list. Referring back to block 749, if the age of the current validated record is (possibly strictly) higher than the uploading age threshold, the analyzer at block 753 discards the current validate record by removing it from the corresponding repository. In this way, it is possible to disregard the validated records that are too old and then likely to be not relevant any longer. The process now continues to block 754 from block 753, from block 752 or directly from block 751 if the current validated record does not relate to the same segment of the new validated record. At this point, the analyzer verifies whether a last validated record of the corresponding repository (up to the new validated record excluded) has been processed. If not, the process returns to block 747 to repeat the same operations on a next validated record. Conversely (once all the validated records have been processed) the loop is exited by descending into block 755.

At this point, the analyzer determines an (aggregation) number of the (aggregated) validated records of the segment of the new validated record as indicated in the aggregation list. The flow of activity branches at block 756 according to a comparison between the aggregation number and the aggregation threshold (indicated in the smart contract). If the aggregation number is (possibly strictly) higher than the aggregation threshold, the analyzer at block 757 calculates a (new) condition indicator of the segment of the new validated record according to the monitoring values of all the aggregated validated records (as indicated in the aggregation list), by applying the aggregation procedure (as indicated in the smart contract). For example, the new condition indicator is calculated to measure a smoothness of the road surface based on an average of the monitoring values of the aggregated validated records. At the same time, the analyzer calculates the determination period of the new condition indicator to span from the least recent one to the most recent one of the collection times of the aggregated validated records. The analyzer then adds a (new) condition transaction for the segment of the new validated record to the corresponding repository (containing the identifier of the segment, the determination period and the condition indicator), at the same time removing the aggregated validated records from the corresponding repository. The analyzer at block 758 invokes the smart contract for adding the new condition transaction to the blockchain. In response thereto, the mining engine competes with the ones of the other servers for solving the mathematical problem required to add the new condition transaction to the blockchain. If the mining engine is the first one to solve the mathematical problem, it adds a corresponding block to its version of the blockchain (in the corresponding repository) and distributes it to the other servers, whereas conversely it receives the corresponding block from another server and adds it to its version of the blockchain (in the corresponding repository). The addition of the new condition transaction to the blockchain defines a corresponding event for the smart contract that may cause the (automatic) execution of one or more actions.

For example, the condition indicators are used to detect (or predict with a certain advance) any critical situation of the location (such as a damaged surface of a road, garbage in a street/square/mall, a criminal act in an airport/station and so on). The critical situation may require an intervention to fix it; in response thereto, the smart contract may issue a corresponding alarm (such as by notifying staff in charge of repairing the road, staff in charge of cleaning the street/ square, police in charge of protecting the airport/station and so on). In addition, the critical situation may involve suggesting an alternative to users of the location (such as a different travelling route for vehicles in case of an accident, high traffic, dangerous road surface and so on). As another example, the condition indicators are used to determine characteristics of the location (such as difficulty level of a bike/hike path, crowd in a mall and so on) that are available for public inspection by users thereof (such as bikers/ runners, clients and so on) for choosing the location that best fit their needs. As other examples, the condition indicators are used to determine corresponding priorities of interventions to be scheduled on different sections of the location, to commit different progress phases of an intervention on the location, to verify a Service Level Agreement (SLA) relating to operation of the location and so on. As other further examples, the condition indicators are used to trigger/condition payment of a fee for an intervention on the location, to module a fee to be paid for travelling along the location, and so on.

Referring back to block 742, if the age of the current monitoring report is (possibly strictly) higher than the uploading age threshold, the validator at block 759 discards the current monitoring report by removing it from the corresponding repository. In this way, it is possible to disregard the monitoring reports that are too old and then likely to not be relevant any longer. The process now continues to block 760 from block 759, from block 758, directly from block 756 if the aggregation number is (possibly strictly) lower than the aggregation threshold or directly from block 745 if the matching number is (possibly strictly) lower than the matching threshold. At this point, the validator verifies whether a last monitoring report of the corresponding repository has been processed. If not, the process returns to block 740 to repeat the same operations on a next monitoring report. Conversely (once all the monitoring reports have been processed) the loop is exited, and the process returns to block 738 waiting for the uploading of a next monitoring report.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plusfunction formulation) should be intended as any structure adapted or configured for carrying out the relevant function.

For example, an embodiment provides a method for monitoring a condition of a location. However, the location may be of any type, and it may be monitored for any purpose (for example, partial, different and additional locations and purposes with respect to the ones mentioned above).

In an embodiment, the method comprises the following steps under the control of each of a plurality of mobile computing devices. However, the mobile computing devices may be in any number and of any type (see below).

In an embodiment, the method comprises storing (by the mobile computing device) a corresponding plurality of monitoring records relating to each of one or more segments of the location. However, the monitoring records may be in any number for each of any number and type of segments (for example, static, dynamic, with any length down to zero in case of segments relating to single positions and so on).

In an embodiment, the monitoring records comprise at least one monitoring record being collected by the mobile computing device passing through the segment. However, the collected monitoring records may be in any number (for example, all the available ones, only the most recent one and so on); moreover, the collected monitoring records may be collected by means of any number and type of sensors, producing signals representative of physical phenomenon and/or receiving manual inputs (for example, partial, different and additional sensors with respect to the ones mentioned above).

In an embodiment, the monitoring records comprise one or more monitoring records being received from one or more source mobile computing devices of the mobile computing devices. However, the received monitoring records may be in any number, and they may be received from any number of source mobile computing devices in any way (for example, via any wireless connections, such as DSRC, Wi-Fi and the like, directly, through repeaters, from any distance, from any direction such as from the front, the back and/or one or both sides, and so on).

In an embodiment, each of the monitoring records comprises one or more monitoring values indicative of a condition of corresponding positions of the corresponding segment. However, the monitoring values may be in any number and of any type (for example, partial, different and additional monitoring values with respect to the ones mentioned above).

In an embodiment, the method comprises transmitting (by the mobile computing device) the monitoring records of each segment being stored to one or more target mobile computing devices of the mobile computing devices. However, the stored monitoring records may be transmitted to any number of target mobile computing devices in any way (for example, either the same or different with respect to the source mobile computing devices).

In an embodiment, the method comprises filtering (by the mobile computing device) the monitoring records of each segment being stored according to a homogeneity thereof. However, the stored monitoring records may be filtered in any way according to any definition of their homogeneity (for example, by calculating an homogeneity index between each received monitoring record and the collected monitoring record and discarding the received monitoring record when the homogeneity index does not reach a homogeneity threshold, by removing the monitoring values of each monitoring record differing from an average value of the monitoring values of all the monitoring records by more than a threshold and so on).

In an embodiment, the method comprises uploading (by the mobile computing device) the monitoring records of each segment being filtered to a central computing system. However, the central computing system may be of any type (see below) and the filtered monitoring records may be uploaded thereto in any way (for example, via any wireless connections, such as 3G-5G, satellite, WLAN and so on).

In an embodiment, this causes the central computing system to validate the monitoring records of each segment being uploaded by the mobile computing devices according to a matching thereof. However, the uploaded monitoring records may be validated in any way according to any definition of their matching (for example, by requiring that the same monitoring record is uploaded by a number of different mobile computing devices reaching any matching threshold, such as static/dynamic, global/individual and so on).

In an embodiment, this causes the central computing system to determine at least one condition indicator of each segment according to the corresponding monitoring records being validated. However, the condition indicators may be in any number and of any type (for example, partial, different and additional condition indicators with respect to the ones mentioned above); moreover, the condition indicators may be determined in any way (for example, by calculating them according to any statistical parameter of the monitoring values, such as mean, standard deviation and the like, by feeding the monitoring values to a neural network and so on) and used for any purpose (for example, addition to a blockchain, publication, notification, statistical analysis and so on).

Further embodiments provide additional advantageous features, which may however be omitted at all in a basic implementation.

In an embodiment, said step of filtering the monitoring records being stored comprises, for each of the segments, calculating (by the mobile computing device) corresponding homogeneity indexes between the monitoring record of the segment being collected and the monitoring records of the segment being received according to a comparison of the corresponding monitoring values. However, the homogeneity indexes may be calculated in any way (for example, based on ratios, products and the like of the corresponding monitoring values, their average, median, mode and the like, increasing/decreasing with the homogeneity and so on).

In an embodiment, said step of filtering the monitoring records being stored comprises, for each of the segments, discarding (by the mobile computing device) the monitoring records of the segment being received according to a comparison of the corresponding homogeneity indexes with a homogeneity threshold. However, the homogeneity threshold may be of any type (for example, static/dynamic, global/individual and so on).

In an embodiment, the method comprises calculating (by the mobile computing device) each of the homogeneity indexes according to a comparison of each of the monitoring values in the monitoring record of the segment being collected with a corresponding one of the monitoring values in the corresponding monitoring record of the segment being received. However, each monitoring value in the collected monitoring record may be compared with any corresponding monitoring value in the received monitoring record (for example, collected at the closest position, with the same index in the monitoring records and so on) in any way (for example, by calculating their ratio, difference and so on).

In an embodiment, the method comprises storing (by the mobile computing device) the monitoring records comprising an indication of corresponding sensor types of the sensors being used to collect the monitoring values thereof. However, the sensors types may be in any number and defined in any way (for example, according to their nature, version, manufacturer, performance and so on).

In an embodiment, the method comprises calculating (by the mobile computing device) each of the homogeneity indexes according to corresponding homogeneity components for the sensor types being common between the corresponding monitoring record of the segment being collected and the corresponding monitoring record of the segment being received. However, the homogeneity index may be calculated according to the homogeneity components in any way (for example, as their mean, median, mode and so on).

In an embodiment, the homogeneity components for each of the common sensor types are calculated according to a comparison of each of the monitoring values of the common sensor type in the monitoring record of the segment being collected with a corresponding one of the monitoring values of the common sensor type in the monitoring record of the segment being received. However, the homogeneity components may be calculated according to any comparison of the corresponding monitoring values (for example, their ratio, difference and so on).

In an embodiment, the method comprises storing (by the mobile computing device) the monitoring records comprising an indication of corresponding collection times. However, the collection times may be determined in any way (for example, at the beginning of the monitoring records, at the completion of the monitoring records, as an average of the collection times of the corresponding monitoring values and so on).

In an embodiment, the method comprises discarding, by the mobile computing device, the monitoring records being stored in response to the corresponding collection times being older than an age threshold. However, the age threshold may be of any type (for example, static/dynamic, global/individual and so on).

In an embodiment, the method comprises uploading (by the mobile computing device) the monitoring records being filtered of each of the segments to the central computing system in response to a number thereof reaching an uploading threshold. However, the uploading threshold may be of any type (for example, static/dynamic, global/individual and so on).

In an embodiment, the method comprises transmitting (by the mobile computing device) the monitoring records being stored to the target mobile computing devices following the mobile computing device along a travel direction of the mobile computing device in the location. However, the monitoring records may be transmitted to these target mobile computing devices in any way (for example, with any technology, to any distance and so on).

In an embodiment, the method comprises transmitting (by the mobile computing device) the monitoring records being stored to the target mobile computing devices travelling at a side of the mobile computing device in an opposite direction of a travel direction of the mobile computing device in the location. However, the monitoring records may be transmitted to these target mobile computing devices in any way (for example, with any technology, to any distance, leftwards/rightwards and so on).

In an embodiment, the method comprises transmitting (by the mobile computing device) the monitoring records being stored to at least one repeater device arranged at the location to cause the repeater device to re-transmit the monitoring records being received from the mobile computing device to the target mobile computing devices. However, the repeater devices may be in any number, of any type and arranged in any way (for example, with any fixed/variable pitch, isolated or connected among then, and so on); moreover, the monitoring records may be transmitted to the repeater devices and re-transmitted by them in any way (for example, with any technology, to any distance, along any direction and so on).

In an embodiment, the method comprises uploading (by the mobile computing device) the monitoring records being filtered to the central computing system to cause the central computing system to determine the condition indicator of each of the segments in response to a number of the mobile computing devices having uploaded the monitoring records of the segment being validated reaching an aggregation threshold. However, the aggregation threshold may be of any type (for example, static/dynamic, global/individual and so on).

In an embodiment, the method comprises uploading (by the mobile computing device) the monitoring records being filtered to the central computing system to cause the central computing system to add the condition indicator of each of the segments to a blockchain. However, the blockchain may be of any type (for example, public, private and so on); moreover, the condition indicators may be added to the blockchain in any way (for example, individually for each segment, cumulatively for the whole location or sections thereof, alone or in combination with any additional information, and so on) and for any purpose (for example, triggering events of a smart contract, notarization and so on).

In an embodiment, the method comprises uploading (by the mobile computing device) the monitoring records being filtered to the central computing system to cause the central computing system to trigger one or more actions defined in a smart contract of the blockchain in response to the condition indicator being added thereto. However, the smart contract may be of any type, it may have been entered by any number and type of subjects, and it may trigger any number and type of actions (for example, partial, different and additional subjects and/or actions with respect to the ones mentioned above).

In an embodiment, the location comprises one or more roads. However, the roads may be in any number and of any type (for example, freeways, arterials, collectors, local roads, paved/gravel roads, one-way/two-way roads, single/multiple lane roads and so on).

In an embodiment, the mobile computing devices are carried by corresponding vehicles travelling on the roads. However, the mobile computing devices may be carried by any vehicles (for example, cars, trucks, buses, motorcycles, bicycles and so on) and in any way (for example, mounted in the vehicles, transported by passengers of the vehicles and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a mobile computing device to perform the method of above when the computer program is executed on the mobile computing device. An embodiment provides a computer program product that comprises one or more computer readable storage media having program instructions collectively stored in said one or more computer readable storage media, the program instructions readable by a mobile computing device to cause the mobile computing device to perform the same method. However, the program may be implemented as a stand-alone module, as a plug-in for a pre-existing program (for example, a navigation app) or even directly in the latter; moreover, the program may take any form suitable to be used by any mobile computing device (see below).

An embodiment provides a mobile computing device comprising means that are configured for performing the steps of the above-described method. An embodiment provides a mobile computing device comprising a circuitry (i.e., any hardware suitably configured, for example, by software) for performing each step of the same method. However, the mobile computing device may be of any type (for example, of partial, different and additional type with respect to the ones mentioned above).

An embodiment provides a system (with a plurality of mobile computing devices and at least one central computing system) comprising means that are configured for performing the steps of the above-described method. An embodiment provides a system comprising a circuitry (i.e., any hardware suitably configured, for example, by software) for performing each step of the same method. However, the system may comprise any number and type of mobile computing devices (see above) and any number and type of central computing systems (for example, physical servers, virtual machines and the like), which communicate among them with any type of wireless connections (see above).

Generally, similar considerations apply if the mobile computing device and the system each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for monitoring a condition of a location, wherein the method comprises:
    storing a plurality of monitoring records relating to one or more segments of the location comprising at least one monitoring record collected by one or more mobile computing devices passing through the segment and one or more monitoring records being received from one or more source mobile computing devices of the one or more mobile computing devices, each of the monitoring records comprising one or more monitoring values indicative of a condition of corresponding positions of the segment;
    transmitting the monitoring records of each segment being stored to one or more target mobile computing devices of the mobile computing devices;
    filtering the monitoring records of each segment being stored according to a homogeneity thereof;
    uploading the monitoring records of each segment being filtered to a central computing system;
    validating, in response to the uploading, the monitoring records of each segment uploaded by the mobile computing devices according to a matching thereof and to determine at least one condition indicator of each segment according to the corresponding monitoring records being validated, wherein the validating comprises calculating a homogeneity index between the monitoring record of the segment being collected and the monitoring records of the segment being received according to a comparison of the corresponding monitoring values wherein the homogeneity index is a measure of similarity between the monitoring record of the segment being collected and the monitoring records of the segment being received; and
    discarding, in response to the validating, the monitoring records of the segment where the homogeneity index is less than a homogeneity threshold.

2. The computer-implemented method according to claim 1, further comprising:
    calculating each of the homogeneity indexes according to a comparison of each of the monitoring values in the monitoring record of the segment being collected with a corresponding one of the monitoring values in the corresponding monitoring record of the segment being received.

3. The computer-implemented method according to claim 1, further comprising:
    storing the plurality of monitoring records comprising an indication of corresponding sensor types of the sensors being used to collect the monitoring values thereof; and
    calculating each of the homogeneity indexes according to corresponding homogeneity components for the sensor types being common between the corresponding monitoring record of the segment being collected and the corresponding monitoring record of the segment being received, the homogeneity components for each of the common sensor types being calculated according to a comparison of each of the monitoring values of the common sensor type in the monitoring record of the segment being collected with a corresponding one of the monitoring values of the common sensor type in the monitoring record of the segment being received.

4. The computer-implemented method according to claim 1, further comprising:
    storing the monitoring records comprising an indication of corresponding collection times; and
    discarding the monitoring records being stored in response to the corresponding collection times being older than an age threshold.

5. The computer-implemented method according to claim 1, further comprising:
    uploading the monitoring records being filtered of each of the segments to the central computing system in response to a number thereof reaching an uploading threshold.

6. The computer-implemented method according to claim 1, further comprising:
    transmitting the monitoring records being stored to the target mobile computing devices following the mobile computing device along a travel direction of the mobile computing device in the location.

7. The computer-implemented method according to claim 1, further comprising:
    transmitting the monitoring records being stored to the target mobile computing devices travelling at a side of the mobile computing device in an opposite direction of a travel direction of the mobile computing device in the location.

8. The computer-implemented method according to claim 1, further comprising:
    transmitting the monitoring records being stored to at least one repeater device arranged at the location to cause the repeater device to re-transmit the monitoring records being received from the mobile computing device to the target mobile computing devices.

9. The computer-implemented method according to claim 1, further comprising:
    uploading the monitoring records being filtered to the central computing system to cause the central computing system to determine the condition indicator of each of the segments in response to a number of the mobile computing devices having uploaded the monitoring records of the segment being validated reaching an aggregation threshold.

10. The computer-implemented method according to claim 1, further comprising:
    uploading the monitoring records being filtered to the central computing system to cause the central computing system to add the condition indicator of each of the segments to a blockchain.

11. The computer-implemented method according to claim 10, further comprising:
    uploading the monitoring records being filtered to the central computing system to cause the central computing system to trigger one or more actions defined in a smart contract of the blockchain in response to the condition indicator being added thereto.

12. The computer-implemented method according to claim 1, wherein the location comprises one or more roads and wherein the mobile computing devices are carried by corresponding vehicles travelling on the roads.

13. A computer program product for monitoring a condition of a location, the computer program product comprising one or more computer readable storage media and program instructions stored on the one or more computer readable storage media, the program instructions including instructions to:

store a plurality of monitoring records relating to one or more segments of the location comprising at least one monitoring record collected by one or more mobile computing devices passing through the segment and one or more monitoring records being received from one or more source mobile computing devices of the one or more mobile computing devices, each of the monitoring records comprising one or more monitoring values indicative of a condition of corresponding positions of the segment;

transmit the monitoring records of each segment being stored to one or more target mobile computing devices of the mobile computing devices;

filter the monitoring records of each segment being stored according to a homogeneity thereof;

upload the monitoring records of each segment being filtered to a central computing system;

validate, in response to the uploading, the monitoring records of each segment being uploaded by the mobile computing devices according to a matching thereof and to determine at least one condition indicator of each segment according to the corresponding monitoring records being validated wherein the validating comprises calculating a homogeneity index between the monitoring record of the segment being collected and the monitoring records of the segment being received according to a comparison of the corresponding monitoring values, wherein the homogeneity index is a measure of similarity between the monitoring record of the segment being collected and the monitoring records of the segment being received; and discard, in response to the validating, the monitoring records of the segment where the homogeneity index is less than a homogeneity threshold.

14. The computer program product of claim 13, further comprising instructions to:

calculate each of the homogeneity indexes according to a comparison of each of the monitoring values in the monitoring record of the segment being collected with a corresponding one of the monitoring values in the corresponding monitoring record of the segment being received.

15. The computer program product of claim 13, further comprising instructions to:

storing the monitoring records comprising an indication of corresponding sensor types of the sensors being used to collect the monitoring values thereof; and calculating each of the homogeneity indexes according to corresponding homogeneity components for the sensor types being common between the corresponding monitoring record of the segment being collected and the corresponding monitoring record of the segment being received, the homogeneity components for each of the common sensor types being calculated according to a comparison of each of the monitoring values of the common sensor type in the monitoring record of the segment being collected with a corresponding one of the monitoring values of the common sensor type in the monitoring record of the segment being received.

16. A computer system for monitoring a condition of a location, comprising:

one or more computer processors;
one or more computer readable storage media;
computer program instructions;
the computer program instructions being stored on the one or more computer readable storage media for execution by the one or more computer processors; and
the computer program instructions including instructions to:

store a plurality of monitoring records relating to one or more segments of the location comprising at least one monitoring record collected by one or more mobile computing devices passing through the segment and one or more monitoring records being received from one or more source mobile computing devices of the one or more mobile computing devices, each of the monitoring records comprising one or more monitoring values indicative of a condition of corresponding positions of the segment;

transmit the monitoring records of each segment being stored to one or more target mobile computing devices of the mobile computing devices;

filter the monitoring records of each segment being stored according to a homogeneity thereof;

upload the monitoring records of each segment being filtered to a central computing system;

validate, in response to the uploading, the monitoring records of each segment being uploaded by the mobile computing devices according to a matching thereof and to determine at least one condition indicator of each segment according to the corresponding monitoring records being validated wherein the validating comprises calculating a homogeneity index between the monitoring record of the segment being collected and the monitoring records of the segment being received according to a comparison of the corresponding monitoring values, wherein the homogeneity index is a measure of similarity between the monitoring record of the segment being collected and the monitoring records of the segment being received; and discard, in response to the validating, the monitoring records of the segment where the homogeneity index is less than a homogeneity threshold.

17. The computer system of claim 16, further comprising instructions to:

calculate each of the homogeneity indexes according to a comparison of each of the monitoring values in the monitoring record of the segment being collected with a corresponding one of the monitoring values in the corresponding monitoring record of the segment being received.

18. The method of claim 1, wherein the validating further comprises:

identifying a sensor type of the monitoring records of the segment being received.

19. The method of claim 1, where the homogeneity index is based on a total number of sensor types.

* * * * *